(12) United States Patent
Drozd et al.

(10) Patent No.: US 9,713,340 B2
(45) Date of Patent: Jul. 25, 2017

(54) ELECTROMAGNETIC SYSTEM

(75) Inventors: James Michael Drozd, Raleigh, NC (US); Josip Simunovic, Raleigh, NC (US)

(73) Assignees: North Carolina State University, Raleigh, NC (US); Aseptia, Inc., Raleigh, NC (US)

( * ) Notice: Subject to any disclaimer, the term of this patent is extended or adjusted under 35 U.S.C. 154(b) by 1006 days.

(21) Appl. No.: 13/120,615

(22) PCT Filed: Sep. 20, 2009

(86) PCT No.: PCT/US2009/057603
§ 371 (c)(1),
(2), (4) Date: Mar. 23, 2011

(87) PCT Pub. No.: WO2010/039466
PCT Pub. Date: Apr. 8, 2010

(65) Prior Publication Data
US 2011/0174385 A1    Jul. 21, 2011

Related U.S. Application Data

(60) Provisional application No. 61/099,434, filed on Sep. 23, 2008.

(51) Int. Cl.
*H05B 6/80* (2006.01)
*H05B 6/78* (2006.01)
(Continued)

(52) U.S. Cl.
CPC ............. *A23L 3/01* (2013.01); *A23L 3/005* (2013.01); *H05B 6/782* (2013.01); *H05B 6/802* (2013.01);
(Continued)

(58) Field of Classification Search
CPC A23L 3/005; A23L 3/01; H05B 6/782; H05B 6/802
(Continued)

(56) References Cited

U.S. PATENT DOCUMENTS 4,417,132 A    11/1983    Simpson
4,808,783 A    2/1989    Stenstrom
(Continued)

FOREIGN PATENT DOCUMENTS

EP    0765105 A2    3/1997
EP    1570753 A1    9/2005
(Continued)

OTHER PUBLICATIONS

Supplementary European Search Report dated Mar. 5, 2012.
(Continued)

*Primary Examiner* — Quang Van
(74) *Attorney, Agent, or Firm* — Merchant & Gould P.C.

(57) ABSTRACT

An electromagnetic system includes a channel and at least one chamber comprising a first end and a second end. The channel traverses at least a portion of a longitudinal length of the at least one chamber, whereby the channel enters the chamber at the first end and exits the chamber at the second end. The channel includes an internal cavity for allowing materials to flow therein and be exposed to electromagnetic energy. In one embodiment, the chamber is designed so that the materials in the channel is exposed to lower electromagnetic energy at the first end of the chamber and exposed to a higher electromagnetic energy at the second end of the chamber.

19 Claims, 27 Drawing Sheets

(51) Int. Cl.
  *A23L 3/01* (2006.01)
  *A23L 3/005* (2006.01)
(52) U.S. Cl.
  CPC ..... *A23V 2002/00* (2013.01); *Y10T 137/0391* (2015.04); *Y10T 137/6606* (2015.04)
(58) Field of Classification Search
  USPC ................. 219/679, 687–697; 426/241, 243, 426/520–523
  See application file for complete search history.

(56) References Cited

U.S. PATENT DOCUMENTS

| | | | |
|---|---|---|---|
| 5,021,981 A | 6/1991 | Swartzel et al. | |
| 5,159,564 A | 10/1992 | Swartzel et al. | |
| 5,290,583 A | * 3/1994 | Reznik et al. | 426/614 |
| 5,309,987 A | 5/1994 | Carlson | |
| 5,387,397 A | * 2/1995 | Strauss et al. | 422/129 |
| 5,417,991 A | 5/1995 | Green | |
| 5,636,317 A | 6/1997 | Reznik | |
| 5,662,031 A | 9/1997 | Qin et al. | |
| 5,697,291 A | * 12/1997 | Burgener et al. | 99/451 |
| 5,722,312 A | 3/1998 | Kristensen | |
| 5,739,437 A | 4/1998 | Sizer et al. | |
| 5,750,907 A | 5/1998 | Botos et al. | |
| 5,776,529 A | 7/1998 | Qin et al. | |
| 5,876,771 A | 3/1999 | Sizer et al. | |
| 5,932,813 A | 8/1999 | Swartzel et al. | |
| 5,998,774 A | 12/1999 | Joines et al. | |
| 6,015,231 A | 1/2000 | Swartzel et al. | |
| 6,019,031 A | 2/2000 | Qin et al. | |
| 6,136,015 A | 10/2000 | Kurz et al. | |
| 6,178,880 B1 | 1/2001 | Mastwijk et al. | |
| 6,246,037 B1 | 6/2001 | Drozd et al. | |
| 6,536,947 B1 | 3/2003 | Swartzel et al. | |
| 6,766,699 B2 | 7/2004 | Swartzel et al. | |
| 6,776,523 B2 | 8/2004 | Simunovic et al. | |
| 6,953,315 B2 | 10/2005 | Cartwright | |
| 7,004,620 B2 | 2/2006 | Simunovic et al. | |
| 7,112,954 B2 | 9/2006 | Palazoglu et al. | |
| 7,144,213 B2 | 12/2006 | Cartwright | |
| 7,213,967 B2 | 5/2007 | Simunovic et al. | |
| 2003/0209542 A1 | 11/2003 | Harris | |
| 2004/0155034 A1* | 8/2004 | Feher et al. | 219/687 |
| 2005/0139594 A1* | 6/2005 | Jones | H05B 6/802 |
| | | | 219/687 |
| 2006/0151533 A1 | 7/2006 | Simunovic et al. | |
| 2007/0018639 A1 | 1/2007 | Palazoglu et al. | |
| 2007/0211784 A1 | 9/2007 | Simunovic et al. | |
| 2011/0036246 A1 | 2/2011 | Simunovic et al. | |

FOREIGN PATENT DOCUMENTS

| | | | |
|---|---|---|---|
| GB | 2098040 A | | 11/1982 |
| GB | 2457495 A | * | 8/2009 |
| JP | 04-290410 A | | 10/1992 |
| JP | 7123918 A | | 5/1995 |
| JP | 2007-135595 A | | 6/2011 |
| KR | 1993-0010449 A | | 6/1993 |
| WO | WO2010039466 | | 4/2010 |
| WO | WO2010039523 | | 4/2010 |

OTHER PUBLICATIONS

International Preliminary Report on Patentability, issued Mar. 29, 2011 for for PCT/US2009/057603, International Bureau of WIPO.
International Search Report and Written Opinion issued May 10, 2010 for PCT/US2009/057603, Korean Intellectual Property Office.
International Search Report and Written Opinion issued May 4, 2010 for PCT/US2009/057989, Korean Intellectual Property Office.
International Preliminary Report on Patentability, issued Mar. 29, 2011 for for PCT/US2009/057989, International Bureau of WIPO.
U.S. Appl. No. 12/565,580.

* cited by examiner

ELECTROMAGNETIC SYSTEM

CROSS REFERENCE TO RELATED APPLICATIONS

This application is a 371 of PCT/US2009/057603, filed on Sep. 20, 2009, entitled ELECTROMAGNETIC SYSTEM, which claims benefit of priority under 35 U.S.C. §119(e) to U.S. Provisional Application No. 61/099,434, filed on Oct. 23, 2008 entitled ELECTROMAGNETIC SYSTEM. To the extent appropriate, a claim of priority is made to each of the above-disclosed applications.

BACKGROUND

There are numerous applications where pumpable materials need to be heated to a specific temperature. Examples include heating food materials to a specific temperature to sterilize or pasteurize the food material. As such, devices and methods for heating pumpable materials in an efficient and effective manner are needed.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF THE INVENTION

Figure 1:
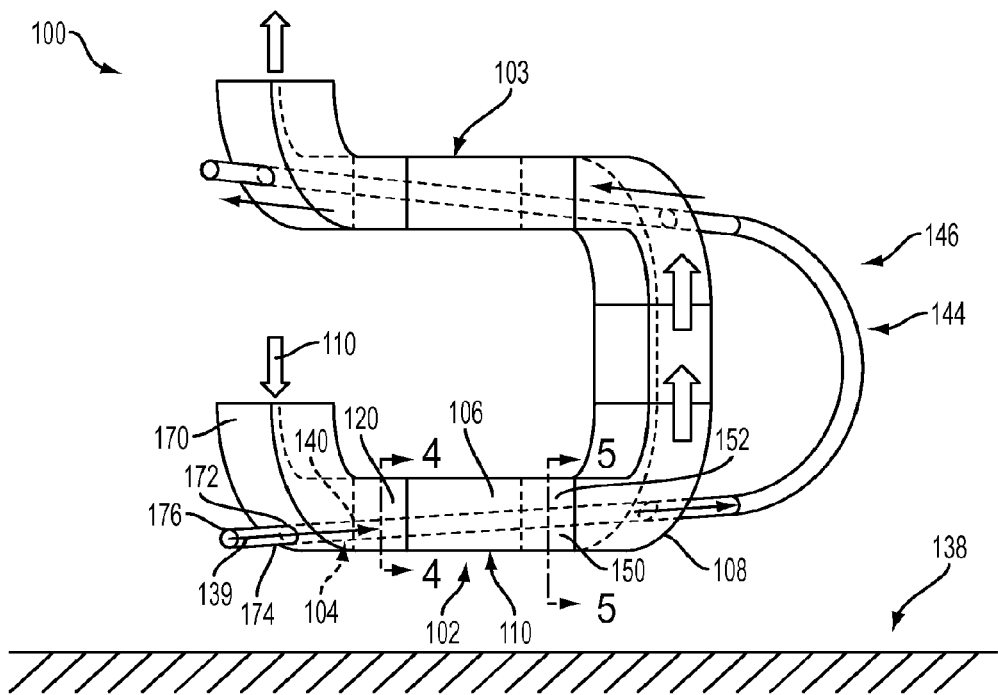
FIG. 1 illustrates a three-dimensional view of a system for processing a material according to one embodiment.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

An embodiment of the present invention is an electromagnetic system for treating pumpable materials 139 with electromagnetic energy 110. Examples of such pumpable materials include biomaterials such as foods materials, pharmaceutical materials, and other materials which are usable by an animal (i.e., a human or other living being). Examples of food materials include soups, mashed potatoes, dog food, or any other materials which is ingestible by an animal. Examples of pharmaceuticals include medicines, cosmetics, or any other item that may be used for any purpose for an animal. The pumpable materials may be pumped throughout the electromagnetic chamber and along a length 120 of the chamber.

The pumpable materials may be homogeneous or heterogeneous. For homogeneous materials, the product is the same. Banana puree is an example of a homogeneous material. Heterogeneous materials have different products contained. For example, chicken noodle soup has noodles, chicken, and broth. In addition, the material could be a multi-phase material. Multi-phase materials could have the same product but in different forms. For example, chunky mashed potatoes could have potato puree and chunks of potato.

An embodiment of the present invention is a method for heating pumpable multi-phase and/or heterogeneous pumpable material. The material is conveyed or flowed in a channel through an electromagnetic energy chamber. A device can be used the convey the material in a channel through the electromagnetic energy chamber. One example is a pump to convey the material in a channel through the electromagnetic chamber. Another example is to use the force of gravity to convey the material. The channel traverses the length of the electromagnetic energy chamber. This chamber is made up of a first end 210 and a second end 212. The first end 210 is where the channel enters the chamber. The second end 212 is where the channel exits the chamber.

This channel could be a cylindrical pipe. In one embodiment the channel is oriented nearly parallel or at a slight angle relative to a horizontal surface. The horizontal surface could be the ground, or Earth. The horizontal surface can also be perpendicular to the force of the gravity. One specific example of a slight angle would be ¼" elevation for each foot of horizontal length. In another embodiment the channel could be oriented nearly perpendicular, i.e. vertically, relative to the ground. In another embodiment the channel could be oriented at a slight angle relative to the ground, such as anywhere from 0 degrees to 40 degrees relative to the ground. In another embodiment, the slight angle may be less than 5 degrees. In another embodiment, the slight angle may be less than about 1.2 degrees.

The channel would be of a composition such that is virtually invisible to the frequency of electromagnetic energy used. This means that when the channel is exposed to electromagnetic energy used, it does not heat significantly relative to the material inside the channel being exposed to electromagnetic energy, and the electromagnetic energy can pass through the channel so that it can be absorbed by the material inside the channel. There are numerous that largely electromagnetic-transparent channel materials including Teflon, ceramics, glass, fiberglass, Ultem, PEEK, TPX, Ultem and other electromagnetic-transparent polymers—or any combination or laminate fabricated from combinations or layer of listed materials.

In one embodiment the material is rapidly heated by exposing the material to a relatively high power electromagnetic energy. The high power electromagnetic energy could be over 20 kW delivered to the material inside the electromagnetic chamber. The high power electromagnetic energy could also be less than 20 kW, such as about 1 kW to 20 kW. In one embodiment rapid heating of a material would be heating the material to above 70° C. in less than 10 minutes. In another embodiment, rapid heating of a material would be heating the material to above 85° C. in less than 15 minutes.

In another embodiment, a plurality of chambers can be employed. Each chamber in the plurality contains the channel which traverses at least a portion of each of the plurality of chambers. For the plurality of chambers, it is possible to use a single source of electromagnetic energy or multiple sources of electromagnetic energy to provide electromagnetic energy to each of the chambers. As a further embodiment, it is possible to use the energy that is absorbed by the material in one chamber as the source of energy in the next chamber. FIG. 1 illustrates this embodiment where a single electromagnetic source 110 treats chamber 102. The energy passes through chamber 102. Energy that is not absorbed by the material in chamber 102 then passes to chamber 103. As another embodiment, a single source of electromagnetic energy could be split and used to treat more than one chamber.

In another embodiment, electromagnetic energy (e.g. at least 20 kW) can delivered simultaneously to the plurality of chambers so that the material can be treated with electromagnetic energy in one or more chambers. The high power electromagnetic energy could also be less than 20 kW, such as about 1 kW to 20 kW. In one embodiment rapid heating of a material would be heating the material to above 70° C. in less than 10 minutes while it is being treated in the plurality of chambers. In another embodiment rapid heating of a material would be heating the material to above 85° C. in less than 15 minutes while it is being treated in the plurality of chambers.

Figure 6:
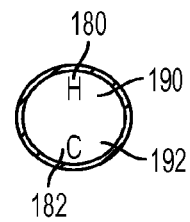
FIG. 6 illustrated the cross section view of a pipe inside the electromagnetic chamber in accordance with another embodiment of the present invention.

For multi-phase and/or heterogeneous materials, another embodiment is the material inside the channel is treated in one portion of the cross section of the channel inside the chamber at a lower energy level than at another portion of the cross section of the channel inside the chamber. As an example, treating one portion of the cross section with a lower energy level than another portion could preferentially heat one portion within the cross section of the channel over another area in an electromagnetic chamber. As an example, electromagnetic energy in the chamber could be higher on the top of the channel and lower on the bottom of the channel. This means the material in the top of the channel would receive more energy than the material in the bottom of the channel. In a pipe, this would correspond to the top side of the pipe being heated more. This example is illustrated in FIG. 6. FIG. 6 illustrates a cross section of the pipe inside the chamber. In FIG. 6, the pipe has a top portion of the cross section 180 and a bottom portion of the cross section 182. The reference letter "H" in FIG. 6 represents a portion of higher electromagnetic energy exposure 190 and the reference letter "C" in FIG. 6 represents a portion of less electromagnetic energy exposure 192. This is useful for multi-phase and/or heterogeneous materials because of the density differences and flow differences between particles in the material and fluid in the material. In another embodiment, the chamber is created so that a lower energy level is exists in some areas of the chamber. For example, the chamber can be created so that the energy pattern illustrated in FIG. 3 wherein the energy level is lower in the bottom and top of the chamber.

In heterogeneous and/or multi-phase food (e.g. fluid with solid pieces), density values of the fluid and solid pieces allow for the ability of a treating system to heat and preserve the product appropriately. In nearly horizontal flow, before entering the heating region, materials with higher density will flow along the bottom of the interior of the pipe, materials with neutral density will flow throughout the interior cavity of the pipe and materials with lower density (i.e. buoyant materials) will flow mainly in the top portion of the pipe. As an example, better heating in the bottom pipe region results in increased temperature and decreased density of the bottom-pipe-flowing materials compared to the top-pipe-flowing materials. Decreased density causes these hotter materials (both fluid and solid components) to move towards the top of the pipe; and colder materials (with higher density) to move towards the bottom of the pipe where the heating takes place again resulting in repetition of the bottom to top movement of the hotter materials and top to bottom movement of the colder materials.

For the electromagnetic energy, microwave energy can be used as a source. This includes using standard industrial frequencies 915 MHz and 2450 MHz. In one preferred embodiment, a 915 MHz microwave generator is used that generates at least 20 kW of microwave energy. It should be understood that other frequencies may be employed and other power levels may be used and the present invention should not be limited to the specific frequencies and power levels explicitly discussed herein.

An embodiment of the present is to treat a pumpable material. Treating can be by exposing the material to electromagnetic energy. Treating can also be heating the material, curing the material, drying the material and/or performing any other function to or with the material.

As illustrated in the exemplary embodiment of FIG. 1, the electromagnetic system 100 includes at least one chamber 102 and at least one channel 104. The system 100 may include a plurality of chambers electromagnetically connected together using waveguide bends 108. The system 100 is connectable to a microwave generator, which is not shown.

Each chamber 102 may be a metallic container capable of directing microwave energy into the materials in the interior cavity 106 of the chamber 102. The chamber 102 may include a metallic waveguide having a longitudinal length 120 and a cross-section (FIG. 2) along such length 120 of the chamber. An example of a chamber is a waveguide.

Figures 2, 3:
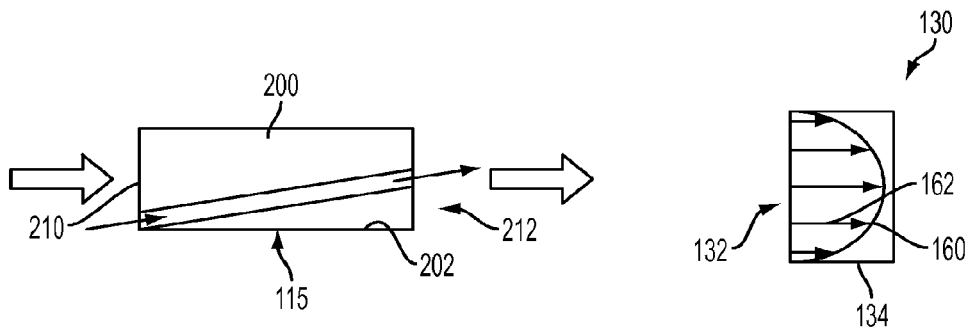
FIG. 2 illustrates a side cross-sectional view of an electromagnetic chamber of FIG. 1 according to an embodiment of the present invention.
FIG. 3 illustrates a front cross-sectional view of an electromagnetic chamber of FIG. 1 in accordance with one embodiment of the present invention.

FIG. 2 is a cross-section 115 along the length 120 of the chamber with a first end 210 and a second end 212. The chamber 102 is bounded by two conductive surfaces 200 and 202.

Figure 7:
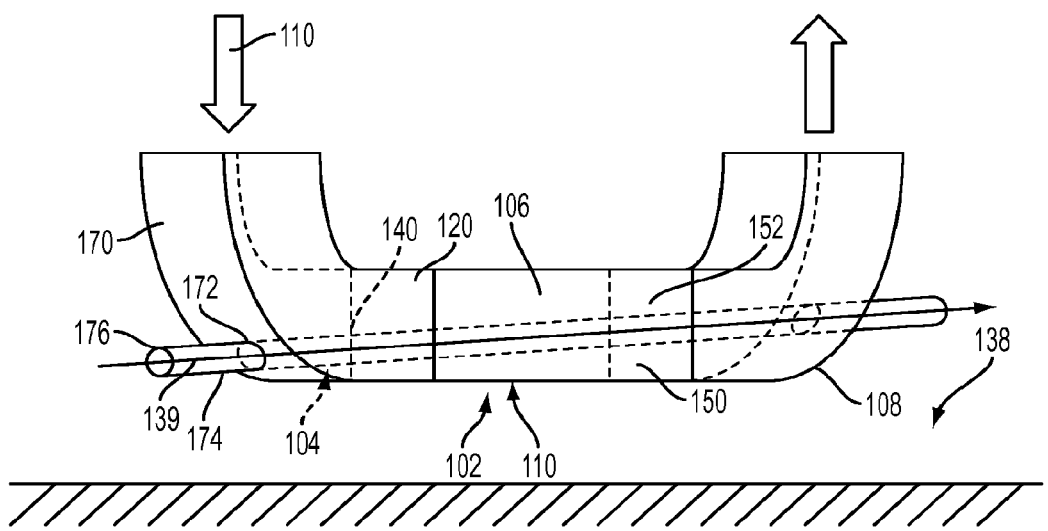
FIG. 7 illustrates a three dimensional view for processing a material according to another embodiment.

FIG. 3 illustrates a cross-section 130 perpendicular to the longitudinal length 120 of the chamber. Such cross-section 130 includes a height 132 and a width 134, where the chamber height 132 is longer than the chamber width 134. Such configuration may form a TE10 mode (or other TE mode) within the chamber 102. Other energy patterns are possible in the chamber are possible with the present invention with the key aspect being the energy level is lower at some area near the conductive surfaces 200 and 202 than another area of the chamber. The chamber 102 may be aligned such that the length 120 of the chamber 102 is substantially parallel to a horizontal surface 138 and the width of the chamber is aligned parallel to a horizontal surface 138 and the height 132 of the chamber 102 being perpendicular to a horizontal surface 138. The horizontal surface 138 could be the ground or any other horizontal surface that is substantially perpendicular to the force of gravity. In one embodiment, the chamber height 132 is longer than the chamber width 134. In a further embodiment, the chamber is oriented relative to a horizontal surface such that the longer side (the height 132) of the chamber is perpendicular or nearly perpendicular to the horizontal surface and the shorter side (the width 134) is parallel or at a slight angle to the horizontal surface at most or all portions along the length 110 of the chamber. An example of this embodiment is illustrated in FIG. 7. In another embodiment, the chamber is oriented relative to a horizontal surface such that the longer side (the height 132) of the chamber and the shorter side (the width 134) are both perpendicular or nearly perpendicular to the horizontal surface. In another embodiment, the chamber is oriented relative to a horizontal surface such that the longer side (the height 132) of the chamber is parallel or at a slight angle to the horizontal surface and the shorter side (the width 134) is perpendicular or nearly perpendicular to the horizontal surface. One specific example of a slight angle would be ¼" elevation for each foot of horizontal length. In one embodiment, a slight angle relative to a horizontal surface is between 0 degrees to 40 degrees relative to the ground. In another embodiment, the slight angle may be less than 5 degrees.

The channel 104 may be any type of passageway that allows for the materials 139 to flow or be pumped with in an interior cavity 140 of the channel 104. One example of the channel 104 may be a pipe. Although a pipe 104 is only an example of the channel, the pipe 104 is referred to herein as the channel for illustrative purposes.

The pipe 104 passes through at least a portion or the full span of a chamber 102 that exposes the material to electromagnetic energy. The chamber 102 is designed so that the amount of electromagnetic energy at the bottom and top of the chamber is less than the energy in the center of the chamber. One example of a chamber would be a waveguide that supports TE10 mode. This energy pattern 160 is shown in FIG. 3 where the arrows represent the electric field 162 of the electromagnetic energy.

The pipe 104 would be of a composition such that is relatively invisible to the frequency of electromagnetic energy used. This means that when the channel is exposed to electromagnetic energy, it does not heat significantly relative to the material inside the channel being exposed to electromagnetic energy, and the electromagnetic energy can pass through the channel so that it can be absorbed by the material inside the channel. As previously discussed, there are numerous largely electromagnetic-transparent channel materials including Teflon, ceramics, glass, fiberglass, Ultem, PEEK, TPX, Ultem and other electromagnetic-transparent polymers—or any combination or laminate fabricated from combinations or layer of listed materials.

As previously discussed, for the electromagnetic energy, microwave energy can be used as a source. This includes using standard industrial frequencies 915 MHz and 2450 MHz. In one preferred embodiment, a 915 MHz microwave generator is used that generates at least 20 kW of microwave energy.

One embodiment of the present invention is an apparatus designed so that the pipe enters the chamber near the bottom portion 150 or the top portion 152 of the chamber 102. The electromagnetic energy delivered to the cross section of the material is higher at one portion of the chamber versus other portions of the chamber. For example, the electromagnetic energy delivered to the chamber is higher near the center of the chamber and lower near the top or bottom of the chamber when the chamber is configured for TE10 mode. This is shown in FIG. 3, which is a cross section of the chamber 102 configured for TE10 mode.

Figure 4:
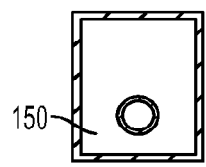
FIG. 4 illustrates front cross-sectional view of an electromagnetic chamber of FIG. 1 in accordance with another embodiment of the present invention.
Figure 5:
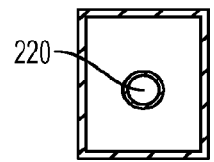
FIG. 5 illustrates a front cross-sectional view of an electromagnetic system in accordance with another embodiment of the present invention.

As illustrated in FIG. 2, the pipe enters the chamber at a lower portion, which corresponds to a lower amount of electromagnetic energy 160 (as illustrated in FIG. 3). As such, as illustrated in FIG. 4, the pipe enters the lower portion of the chamber. Introducing the pipe near the bottom portion 150 or top portion 152 of the chamber 102 minimizes reflections of the energy so as to maximize the energy imparted in the material. It also serves to more gradually expose the material to electromagnetic energy. In this embodiment, the pipe leaves the chamber around the center of the chamber, which is illustrated in FIG. 5.

FIG. 6 illustrates a cross section of the pipe of FIG. 4. In FIG. 6, the pipe has a top portion of the cross section 180 and a bottom portion of the cross section 182. The reference letter "H" in FIG. 6 represents a portion of higher electromagnetic energy exposure 190 and the reference letter "C" in FIG. 6 represents a portion of less electromagnetic energy exposure 192.

As illustrated in FIG. 7, the chamber may be connected to one or more bends 170 on each side that bring the electromagnetic energy from the generator to the chamber. The bends 170 have an opening 172 for the pipe. This opening 172 has chokes 174 in place that prevent electromagnetic energy leakage from the chamber 102. In an exemplary embodiment, the choke is a metal sleeve 176 that attaches to the bend. The metal sleeve 176 is slightly larger than the diameter of the pipe to allow the pipe to pass through it. The sleeve 176 is longer than a quarter wavelength of the electromagnetic energy.

By having the pipe enter at a lower energy area of the chamber, it allows energy to flow into the chamber more readily. First, this minimizes reflections and maximizes the energy that can be absorbed by the material. Second, by starting at a lower energy point in the chamber, it creates less shock on the material, i.e. a more gradual change in temperature of the material. Third, starting at lower energy allows the material to be exposed to the electromagnetic energy over a longer period of time. Fourth, as the pipe enters the chamber, more energy is absorbed on the bottom or top area of the material inside the pipe, depending if the pipe enters the top or bottom of the chamber. Entering on the top of the chamber places more energy on the bottom of the pipe area. Entering on the bottom of the chamber places more energy on the top of the pipe area. This could be advantageous for heterogeneous and/or multi-phase materials.

Figure 8:
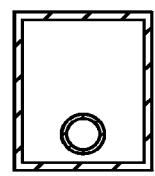
FIG. 8-9 illustrate front cross-sectional views of electromagnetic chambers and front cross-sectional views of the pipe therein, respectively in accordance with some embodiments of the present invention.
Figure 9:
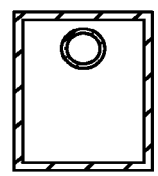
Figure 10:
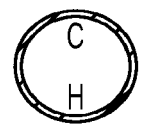
FIG. 10 illustrated the cross section view of a pipe inside the electromagnetic chamber in accordance with another embodiment of the present invention
Figure 11:
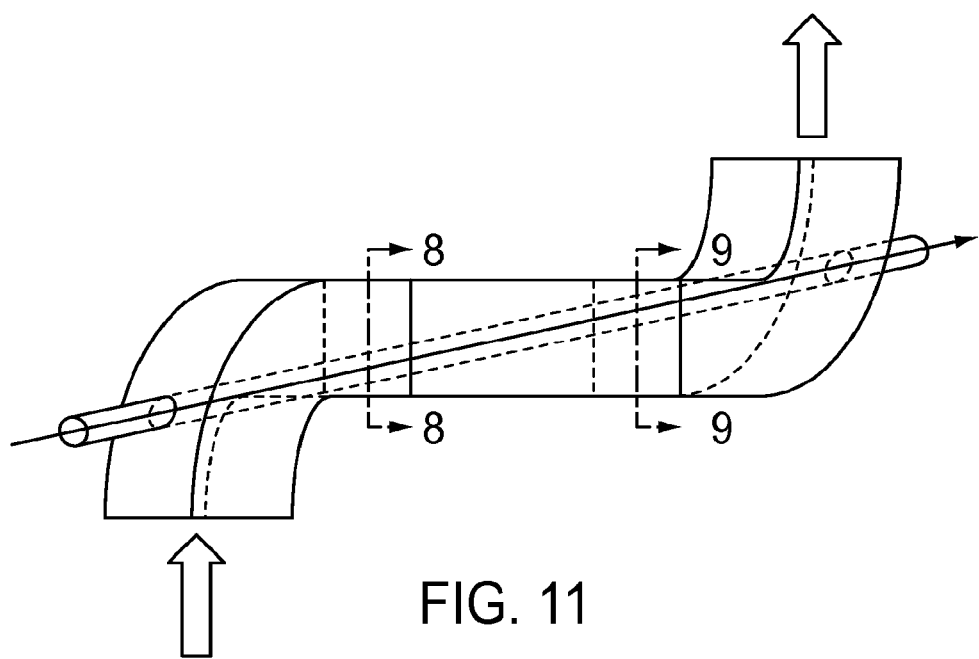
FIG. 11 illustrates a three-dimensional view of an electromagnetic chamber with a pipe passing through in accordance with one embodiment of the present invention.

Another embodiment of the present invention is a system configured so that the pipe enters the chamber near the bottom (or top) of the chamber and exits at the top (or bottom) of the chamber. This is shown in FIGS. 8 and 9, which are cross-sectional views similar to those of FIGS. 4 and 5. FIG. 8 illustrates that the pipe enters the bottom portion of the chamber at the beginning portion of the chamber length and FIG. 9 illustrates the pipe entering the top portion of the chamber at the end of the chamber length. The pipe has a top portion of the cross section 180 and a bottom portion of the cross section 182. FIG. 10 shows a cross-section of the pipe shown in FIG. 9, where "H" represents a region of higher energy exposure 190 and "C" represents a region of lower energy 192. It is noted that FIG. 6 shows a heating pattern of the cross-section of the pipe of FIG. 8. Nonetheless, like the embodiment of FIG. 4, introducing the pipe near the bottom or top of the chamber minimizes reflections of the energy so as to maximize the energy imparted in the material. It also serves to more gradually expose the material to electromagnetic energy. Additionally, the material is initially exposed to higher energy on one side of the pipe at entry. As the material is conveyed through the pipe, the energy pattern is reversed so that the material is exposed to higher energy on the other side of the pipe. In other words, upon entry, the material in the top portion of the pipe is heated more upon entry of the chamber while the material at the lower portion of the pipe has a lower electromagnetic energy exposure. As the material flows in the pipe along the length of the chamber, the electromagnetic energy exposure in the pipe become equal at all portions in the pipe. Then, after the pipe continues to the exit at the other end of the chamber, the material in the top portion of the chamber has lower energy exposure relative to the lower portion of the pipe. This allows will tend to balance the energy the cross section that the material will receive. FIG. 11 further illustrates. The chamber has bends on each side that bring the electromagnetic energy from the generator to the chamber. The bends have an opening for the channel, in this case a cylindrical pipe. This opening has chokes in place that prevent leakage from the chamber. The choke is a metal sleeve that attaches to the bend. The sleeve is slightly larger than the diameter of the pipe to allow the pipe to pass through it. The sleeve is longer than quarter wavelength of the electromagnetic energy. Not shown is the electromagnetic energy generator that created the electromagnetic energy. The channel enters at the first end of the chamber near the bottom of the chamber and exits at the second end of the chamber at the top the chamber. The channel exits through a bend that has a choke attached.

Figure 12:
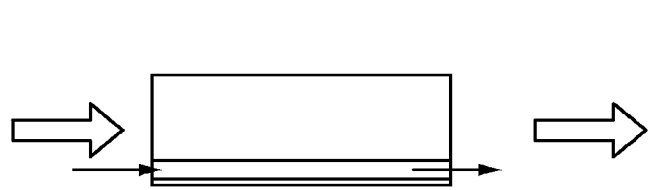
FIG. 12 illustrates a side cross sectional view of an electromagnetic system in accordance with another embodiment of the present invention.

In another embodiment (shown as a cross section FIG. 12), the channel enters the chamber on the bottom and exits the chamber at the bottom, i.e. on the same side as the entry. The channel could also be shown entering on the top of the chamber and exiting the top of the chamber. This embodiment maintains the material in a lower energy area of the chamber throughout the length of the chamber. This could be used with sensitive materials that cannot tolerate a higher electromagnetic power density. It also serves to lengthen the exposure area for the material. Like other embodiments, as the pipe enters the chamber, more energy is absorbed on the bottom or top area of the material inside the pipe, depending if the pipe enters the top or bottom of the chamber. Entering on the top of the chamber places more energy on the bottom of the pipe area. Entering on the bottom of the chamber places more energy on the top of the pipe area. This could be advantageous for heterogeneous and/or multi-phase materials.

Figure 42:
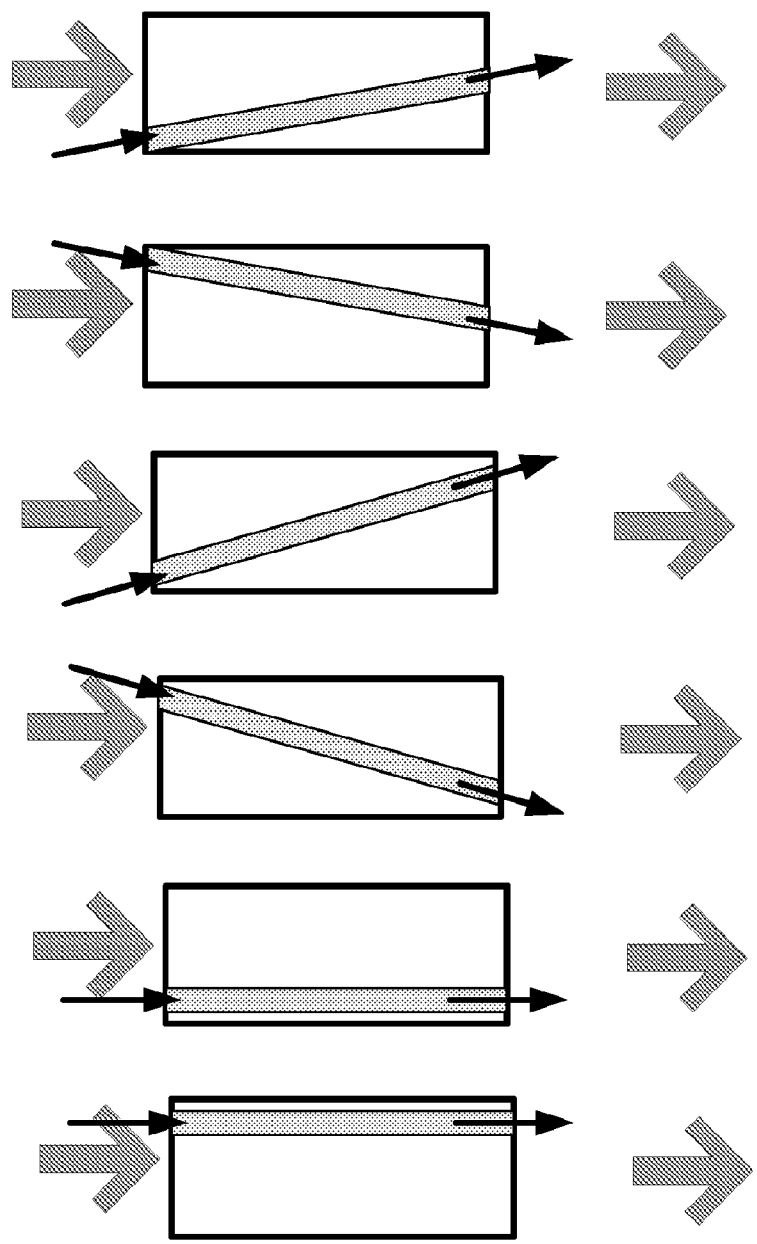
FIG. 42 illustrates side cross sectional views of possible channel orientations within a chamber

Other possible embodiments are the chamber is designed so that the channel one of: 1) enters near a top portion of the chamber and exits near a bottom portion of the chamber, 2) enters near a bottom portion of the chamber and exits near a top portion of the chamber, 3) enters near a top portion of the chamber and exits near a top portion of the chamber, 4) enters near a bottom portion of the chamber and exits near a bottom portion of the chamber, 5) enters near a top portion of the chamber and exits near the center portion of the chamber, or 6) enters near a bottom portion of the chamber and exits near the center portion of the chamber. Enters means the channel passes through an opening 172 into a chamber at first end 210. Exits means the channel passes through an opening at the second end 212. FIG. 42 illustrates different possible combinations of entry and exit of the channel through the chamber.

Figure 13:
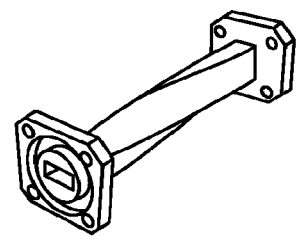
FIG. 13 illustrates a view of an electromagnetic system in accordance with another embodiment of the present invention.
Figure 14:
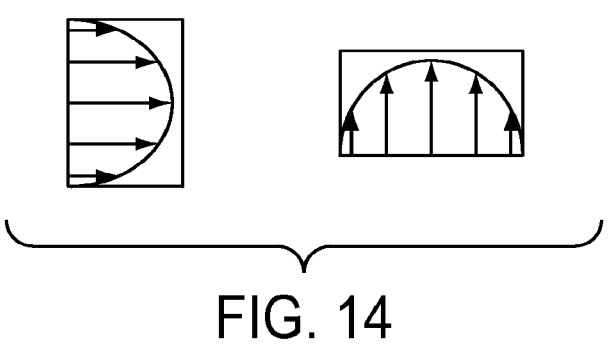
FIG. 14 illustrates a front cross-sectional view of the electromagnetic chamber with another embodiment of the present invention FIG. 15 illustrate front cross-sectional views of electromagnetic chambers and front cross-sectional views of the pipe therein, respectively in accordance with some embodiments of the present invention.
Figure 15:
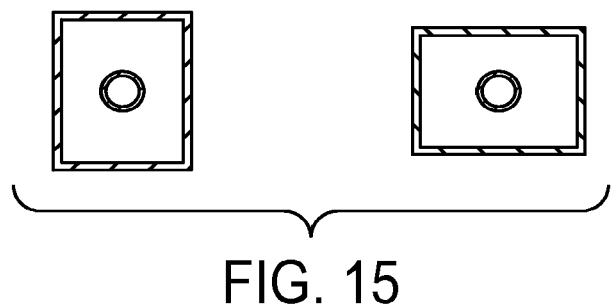
Figure 16:
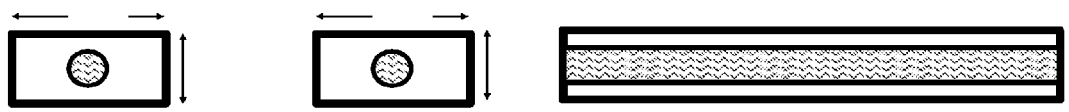
FIGS. 16-39 illustrate other embodiments of the present invention
Figure 17:
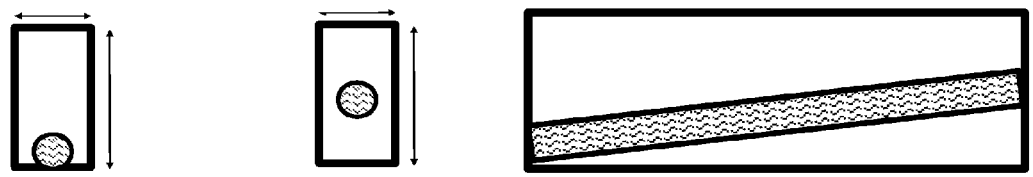
Figure 18:
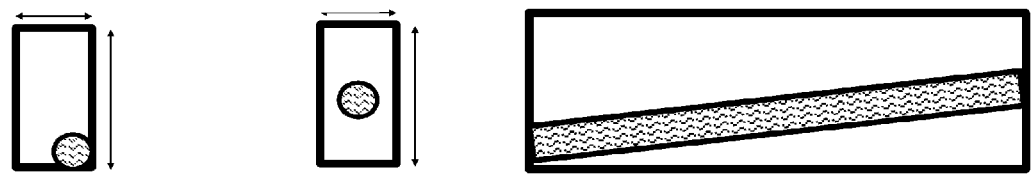
Figure 19:
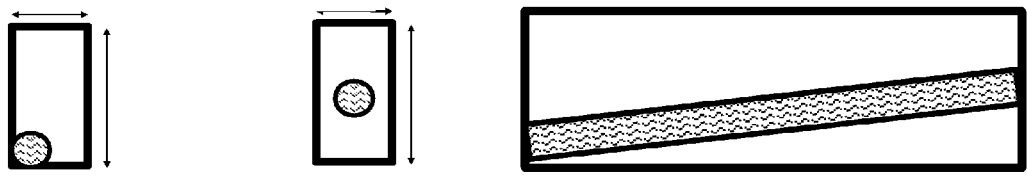
Figure 20:
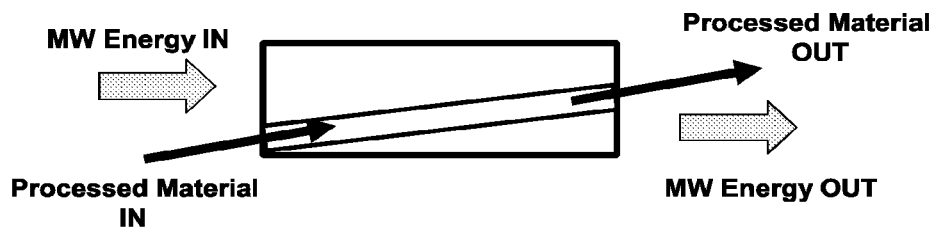
Figure 21:
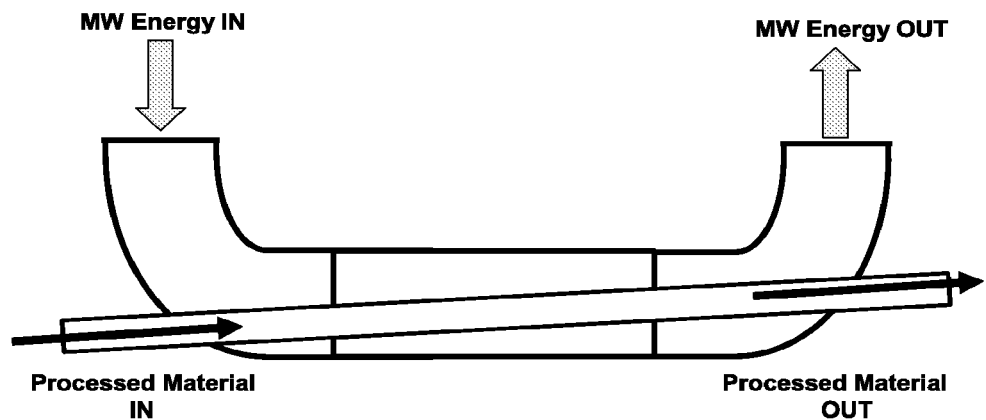
Figure 22:
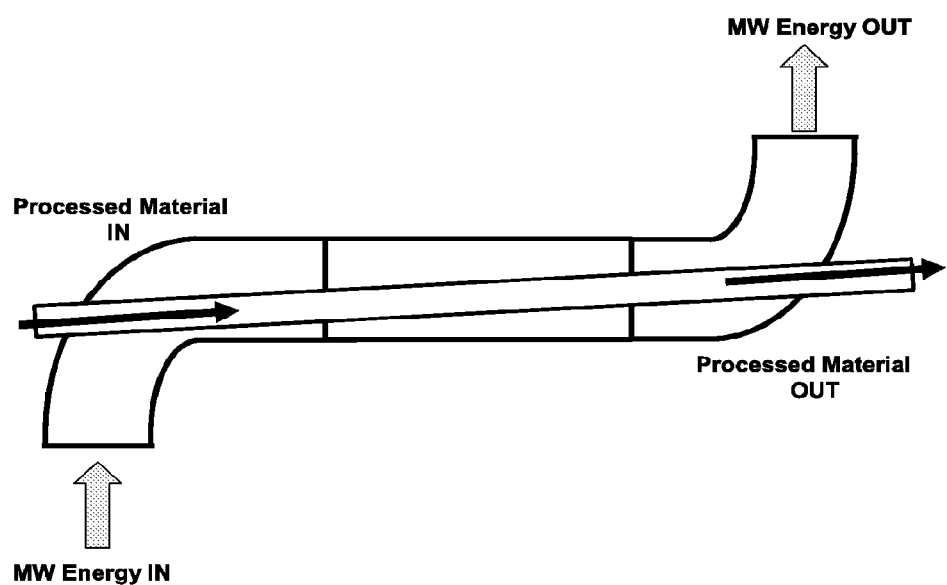
Figure 23:
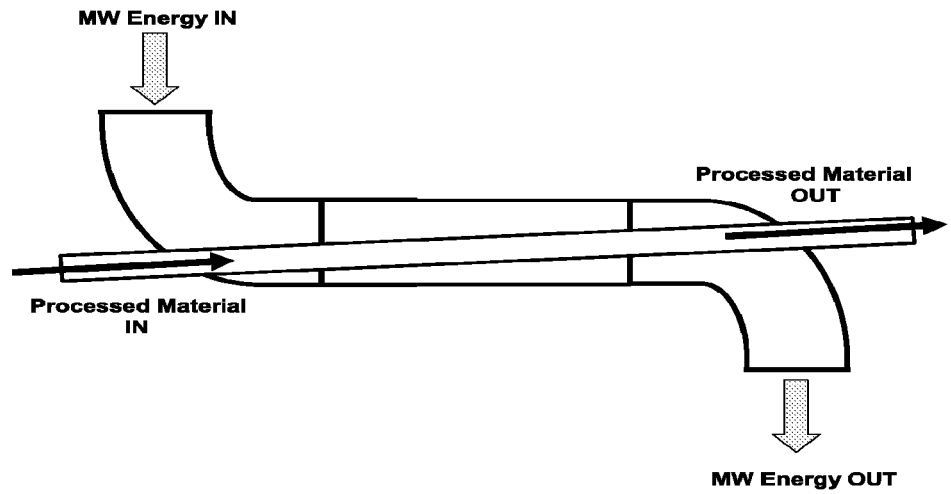
Figure 24:
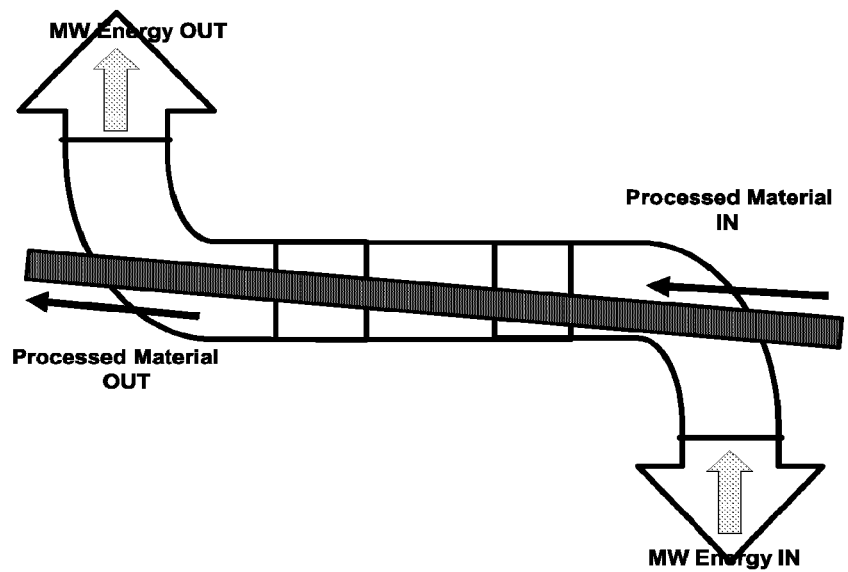
Figure 25:
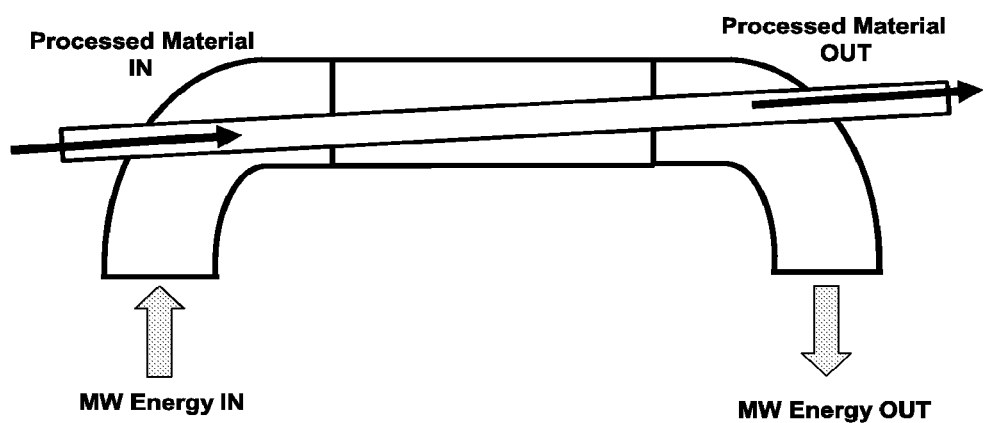
Figure 26:
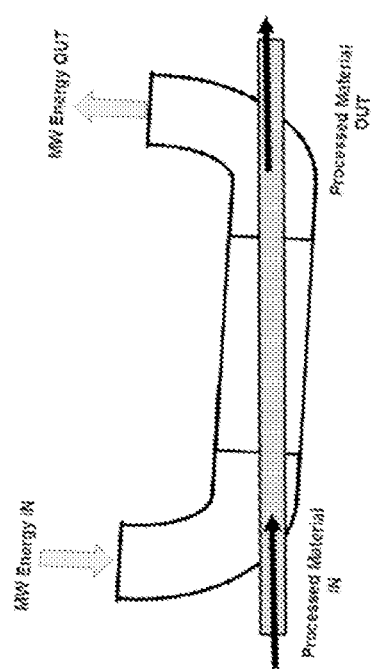
Figure 27:
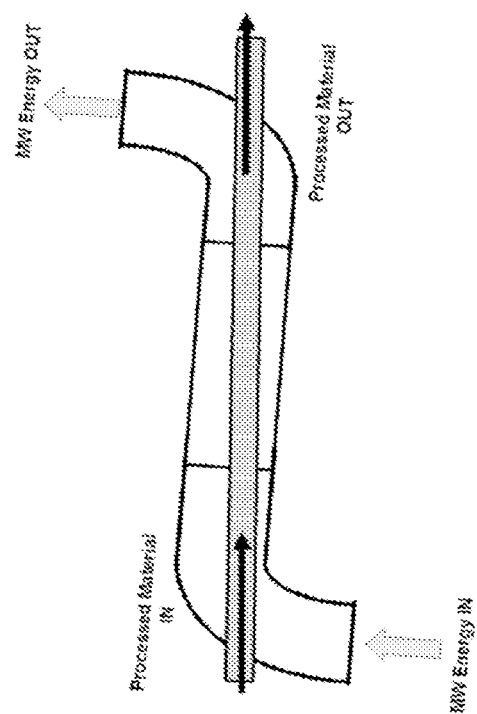
Figure 28:
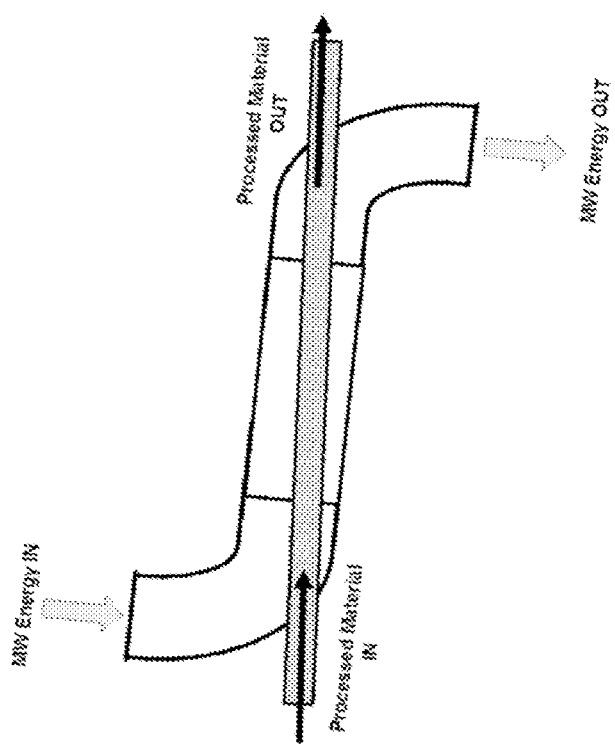
Figure 29:
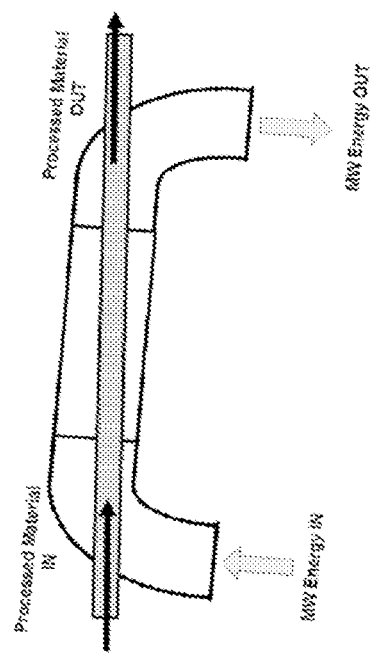
Figure 30:
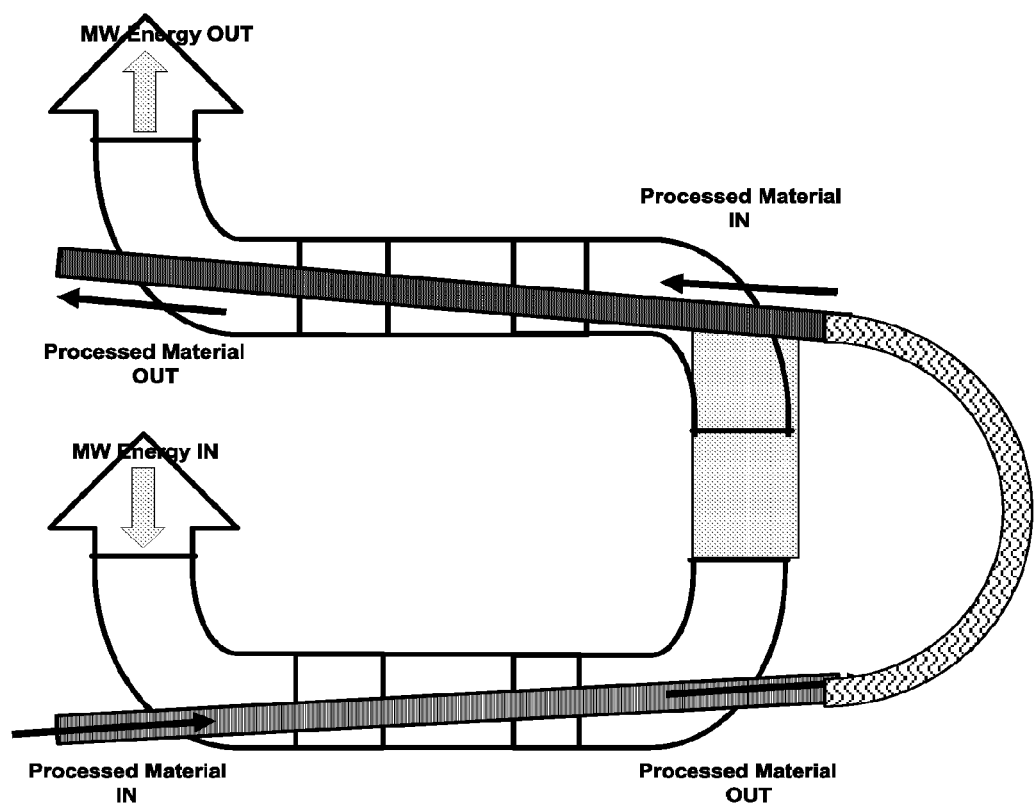
Figure 31:
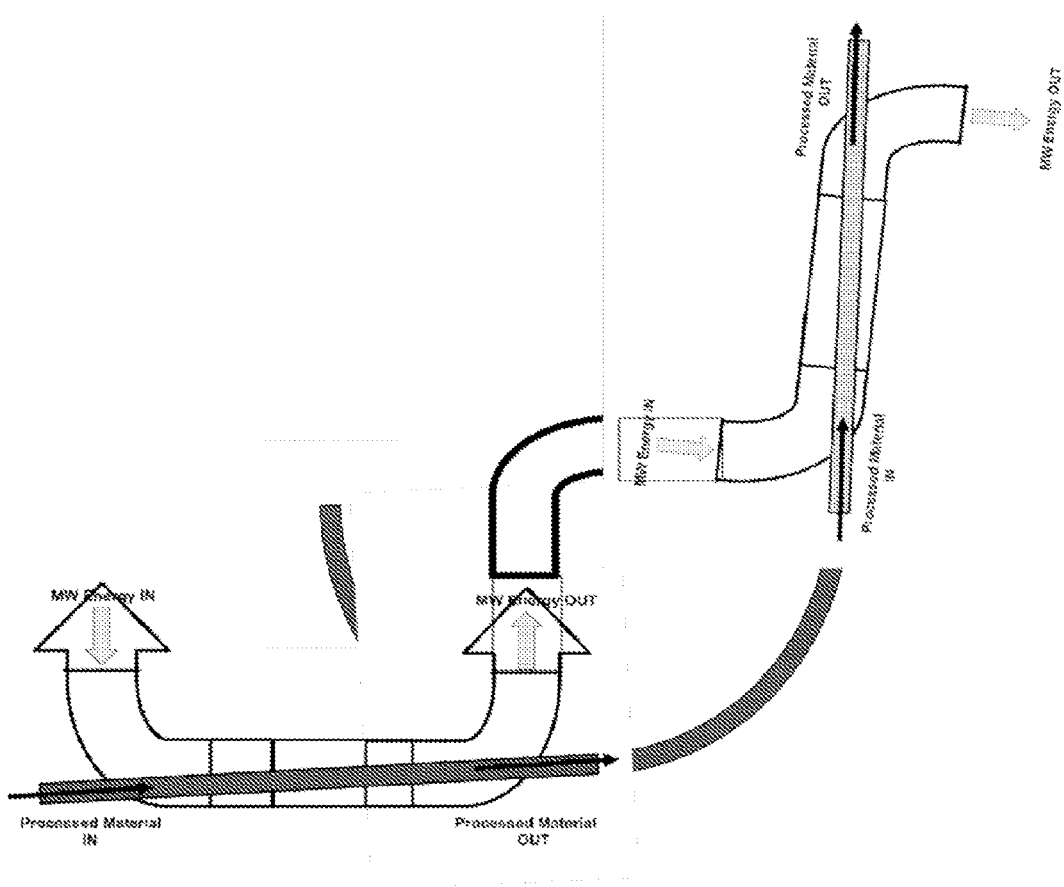
Figure 32:
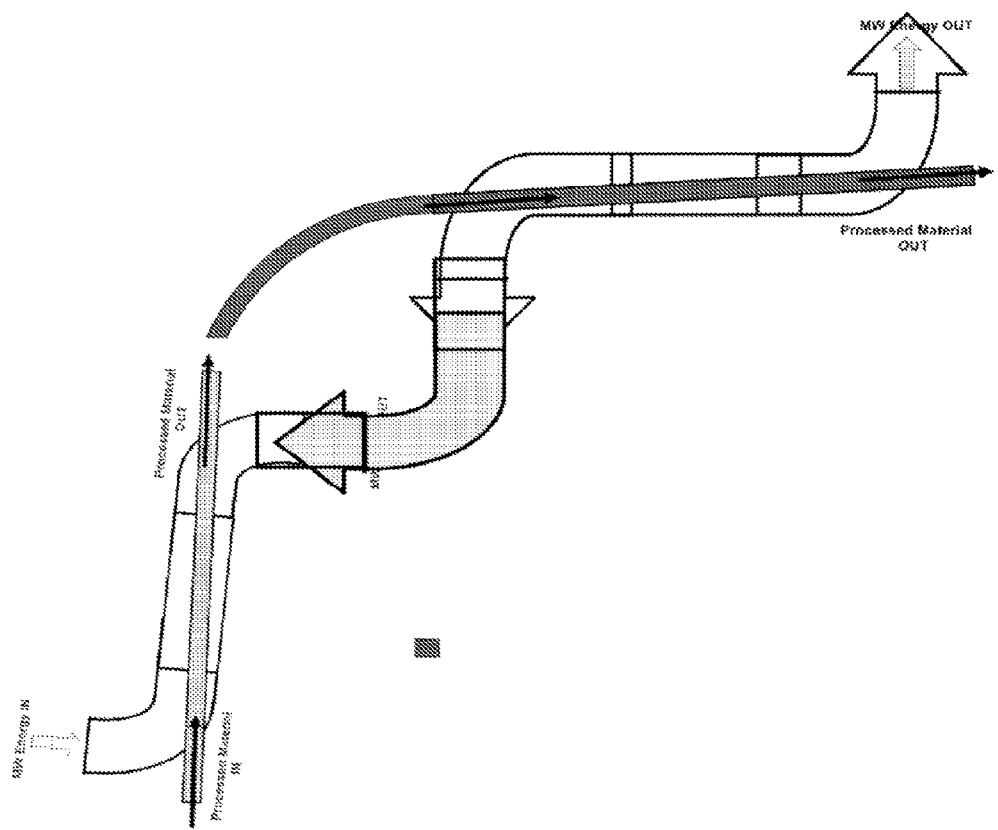
Figure 33:
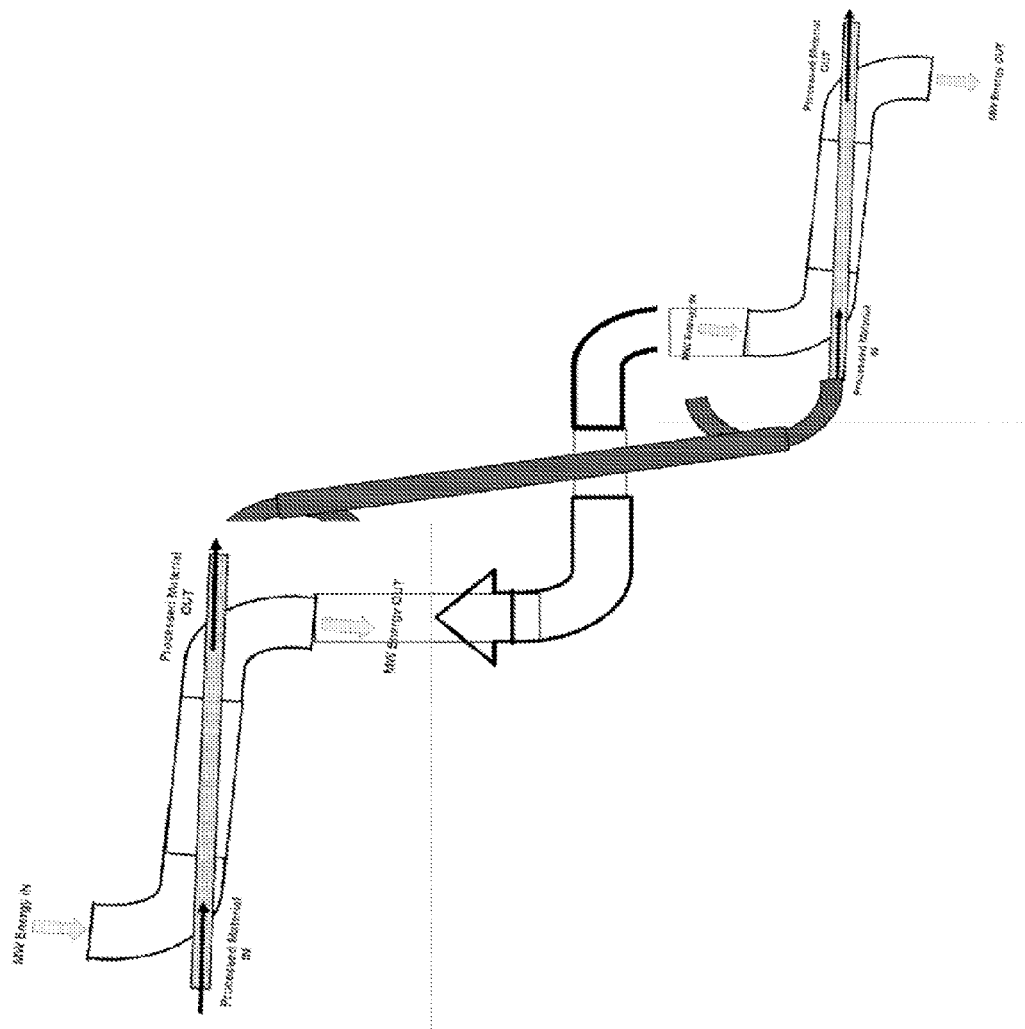
Figure 34:
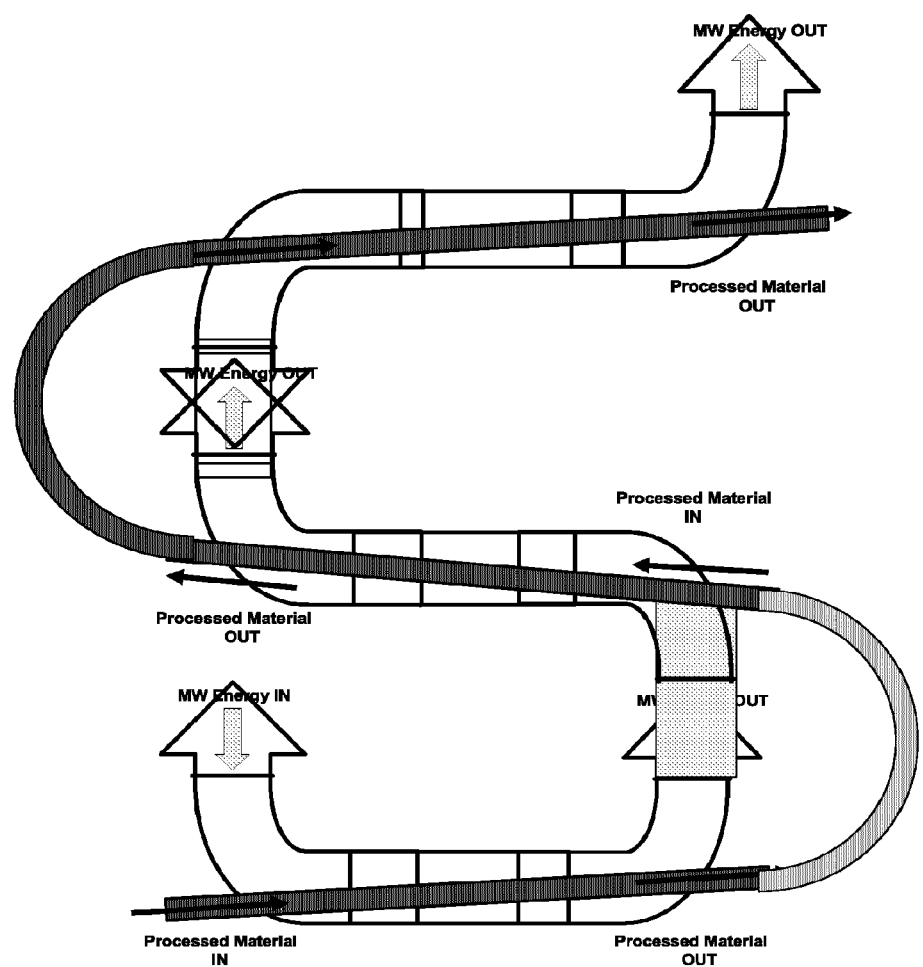
Figure 35:
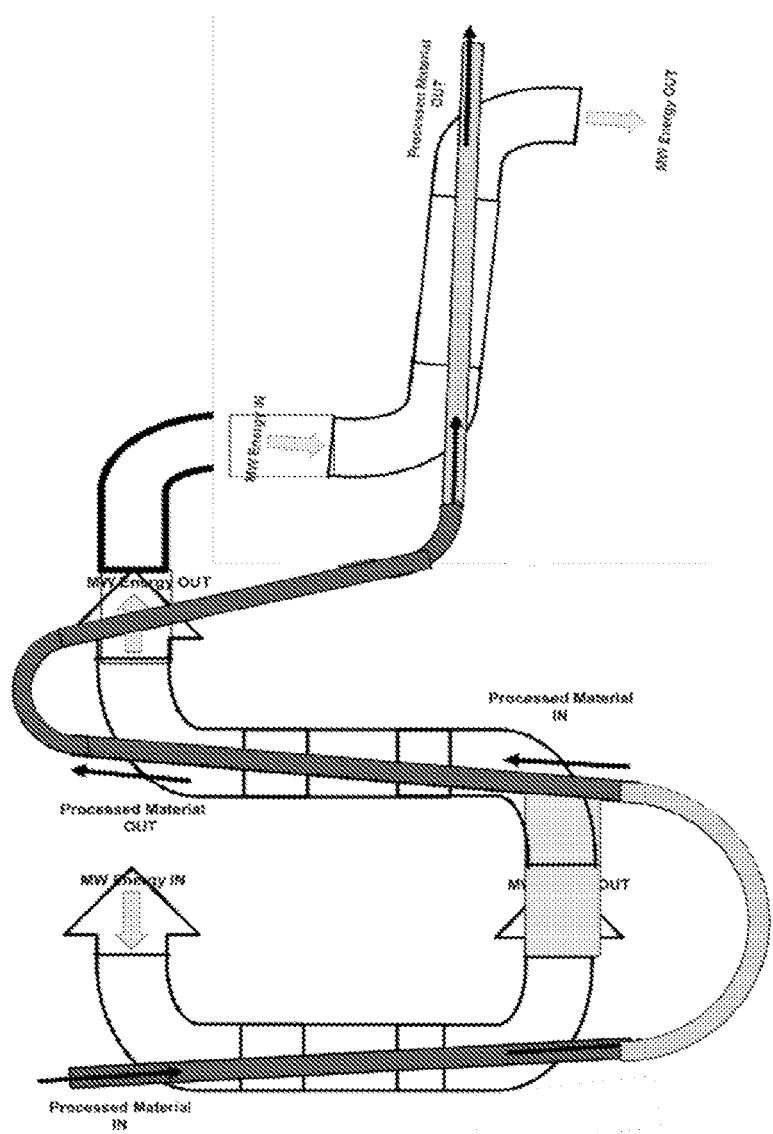
Figure 36:
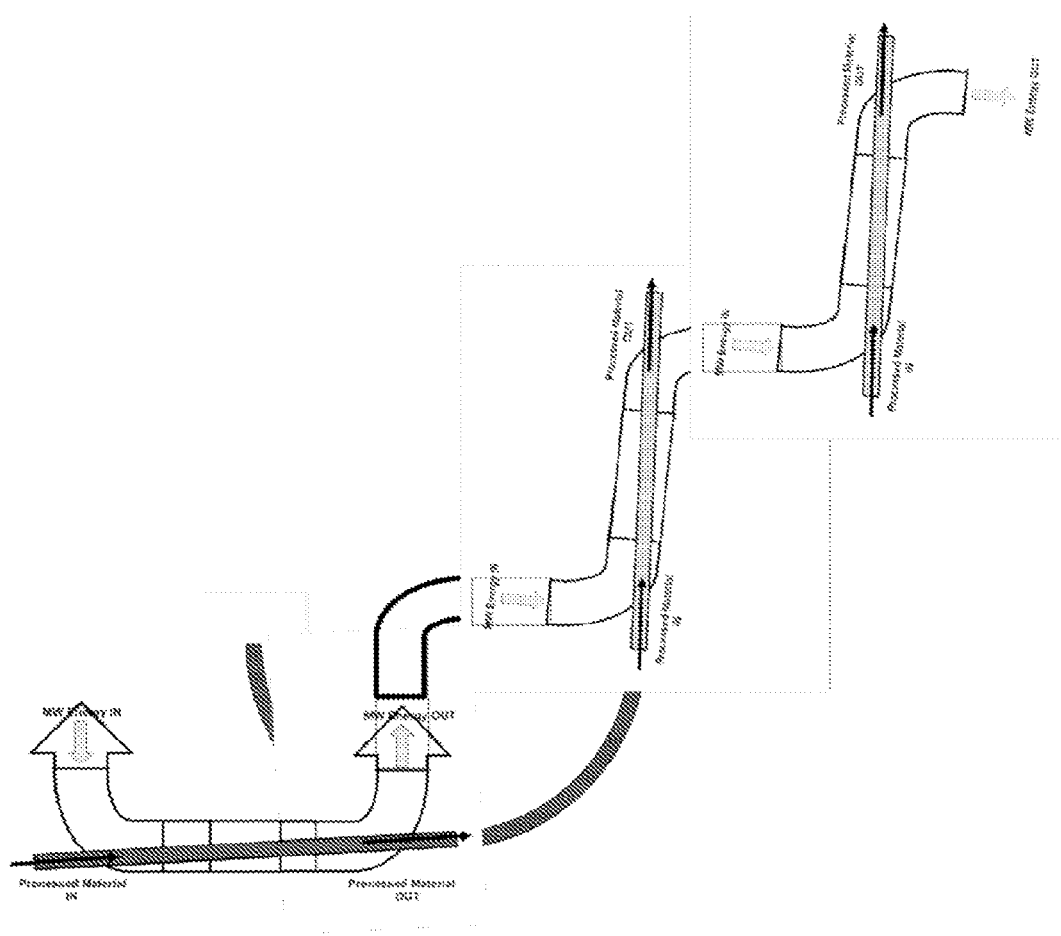
Figure 37:
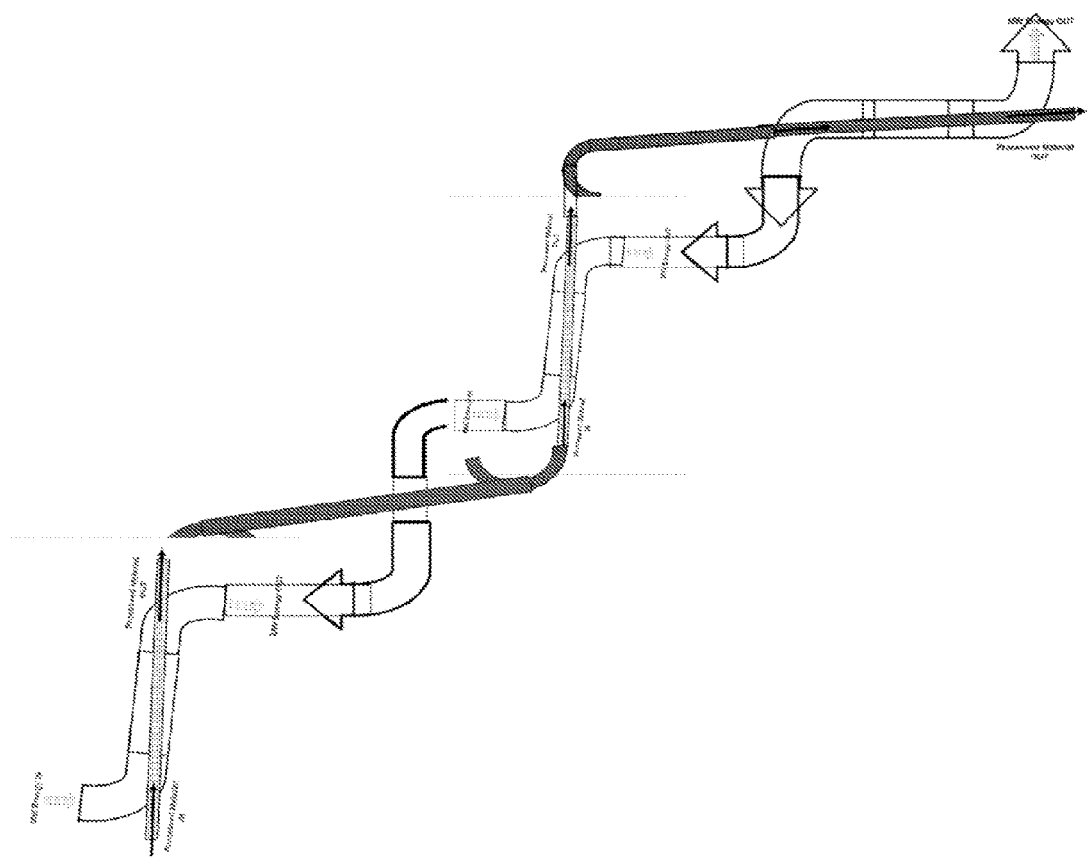
Figure 38:
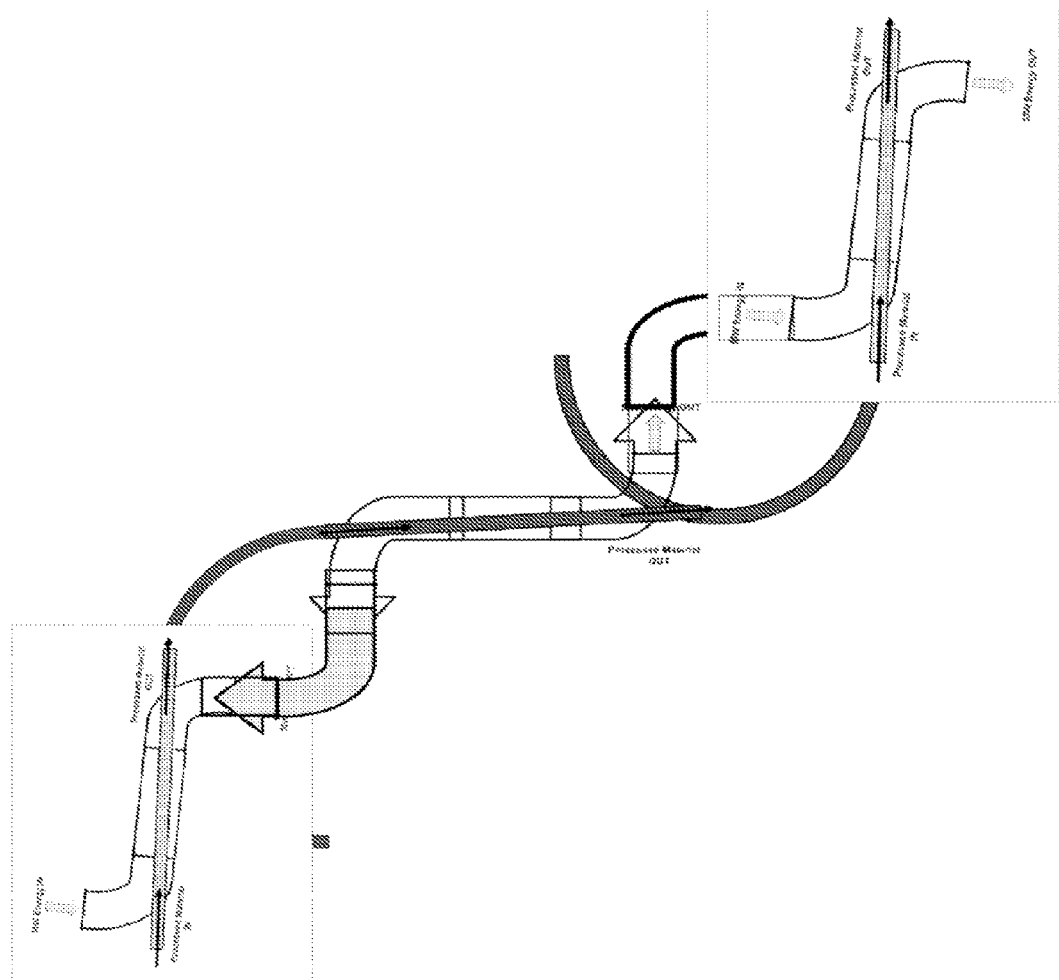

Another embodiment is that the chamber is twisted as shown in FIG. 13. In this embodiment, the energy pattern where the pipe enters and exits the chamber is shown in FIG. 14. The electric field polarization is shown in FIG. 14 as the arrows. Thus, the electric field polarization rotates down the length of the chamber. The electric field is the mechanism for heating in most biomaterials. A rotating electric field pattern can help create more uniform heating. FIG. 15 shows one embodiment of this where the pipe enters in the middle of the chamber and exits at the middle of the chambers. Variations of this include having the pipe enter or exit near the top or bottom. The twisted chamber may create more even heating of some materials.

Each of the above embodiments can be placed in a multi-chamber system. There are a number of possible variations. Chambers can be placed horizontally or vertically or any combination relative to each other. The material can enter and exit each chamber through the bends. A choke at the end of each bend is used to limit electromagnetic energy from escaping. In between chambers, the material can be mixed and/or monitored outside of the electromagnetic energy environment.

FIG. 1 illustrates an embodiment of a two chamber system. The material 139 flows into the first chamber inside a channel 104. This channel could be a cylindrical pipe. The material inside the channel enters the chamber 102 through an opening 172 in bend 170. Extending from the bend if a choke 174 which limits electromagnetic energy from the outside environment. One example of a choke is a metal sleeve 176 that is larger in diameter than the channel and is at least a quarter wavelength of the frequency of the electromagnetic energy in length. The channel is at a slight elevation angle to the ground 138. The material 139 inside the channel passed down the length 110 the first chamber 102. The chamber has a top 152 and bottom 150. The material inside the channel exits the chamber 102 at the bend 108 through a choke. After the material exits the bend and chokes, the material can sent through one or more mixing systems 144 or monitoring systems 146. The material then goes into a second electromagnetic chamber 103. This embodiment allows for additional mixing or monitoring of the product outside of the electromagnetic energy environment. Additionally, this system could spread out the time the material is exposed to the electromagnetic energy which lowers the power density on the material. This allows consistent heating of materials that are sensitive to rapid changes in temperature. Further, the multi-chamber system can lead to a more compact footprint.

Another embodiment of the present invention is a process that allows new food products to be created and the food products created. The process uses electromagnetic energy to rapidly heat a material as it pumped or flows through an chamber. In one embodiment the electromagnetic energy heats the food product to a temperature of at least 70° C. in less than 10 minutes. In another embodiment the electromagnetic energy heats the food product to a temperature of at least 85° C. in less than 15 minutes. In another embodiment the electromagnetic energy heats the food product to a temperature of at least 120° C. in less than 20 minutes. The product is held at near the temperature exiting the electromagnetic chamber for a short amount of time, e.g. less than 5 minutes. The product is cooled and packaged without exposing the product to the outside environment. The package is sterilized and the product is added to the package in a sterile environment.

As an embodiment of a new product created, strawberries either sliced, diced, pureed, or whole or any combination can be created in a package that can be stored in ambient conditions (i.e. without refrigeration) for at least 6 months without spoiling. Furthermore, vitamin C retention in the strawberries is greater than or equal to 90% of the vitamin C content before processing. In another embodiment, anthocyanin retention in the strawberries is greater than or equal to 90% of the anthocynanin content before processing. To allow strawberries to be pumped it is possible to add pureed strawberries or a fluid that is similar in its composition.

As an embodiment of new product created, blueberries either sliced, diced, pureed, or whole or any combination can be created in a package that can be stored at ambient conditions (i.e. without refrigeration) for at least 6 months without spoiling. Furthermore, vitamin C retention in the blueberries is greater than or equal to 90% of the vitamin C content before processing. To allow blueberries to be conveyed, e.g. pumped, it is possible to add pureed blueberries or a fluid that is similar in its composition such as white grape juice. This embodiment can be extended to other berry products. Examples include blackberries, raspberries, boysenberries, and grapes. As another embodiment of new product created, blueberries either sliced, diced, pureed, or whole or any combination can be created in a package that can be stored in ambient conditions (i.e. without refrigeration) for up to 12 months without spoiling with anthocyanin retention in the blueberries is greater than or equal to 90% of the anthocyanin content before processing.

As an embodiment of new product created, peaches either sliced, diced, pureed, or whole or any combination can be created in a package that can be stored at ambient conditions (i.e. without refrigeration) for up to 12 months without spoiling. Furthermore, vitamin C retention in the peaches is greater than or equal to 90% of the vitamin C content before processing.

As an embodiment of new product created, tomatoes either sliced, diced, pureed, or whole or any combination can be created in a package that can be stored at ambient conditions (i.e. without refrigeration) for up to 12 months without spoiling. Furthermore, vitamin C retention in the tomatoes is greater than or equal to 90% of the vitamin C content before processing. As another embodiment, lycopene retention in the tomatoes is greater than or equal to 70% of the lycopene content before processing. One embodiment of the present invention is to acidify the tomatoes prior to rapidly heating the tomatoes in the electromagnetic chamber. One method of accomplishing this is to add citric acid. Another embodiment of the present invention is to add a product that helps preserve the texture, such as calcium salt, calcium chloride, to the tomatoes prior to rapidly heating the tomatoes in the chamber.

In one embodiment, as system of one or more microwave generators, waveguides, applicators, circulators, water loads and microwave choking interfaces. One element of the subsystem is an ex-centric flow microwave applicator.

The ex-centric traveling wave applicator consists of a straight waveguide segment, two H-bend type metal waveguide elbows each fitted with a cylindrical segment of a metal pipe and a microwave-transparent flow-through, product-carrying conduit entering the applicator through one cylindrical metal pipe segment and exiting the applicator through the other, opposing metal tube segment. The entry location of the microwave transparent tube is positioned off-center relative to the rectangular cross section of the straight waveguide segment at the product and microwave entry-end. The exit location of the product-carrying, microwave-transparent tube conduit is aligned approximately with the center-point location of the straight portion of the metal waveguide.

In the horizontal configuration of the waveguide, treated product flows along a slight upwards incline (at least inch of upward incline per foot of length) in order to establish a flow that can be self-draining in the case of power loss, process interruption and/or under-processing. In the vertical configuration of the applicator, the product flow is self-draining by virtue of its vertically upward direction.

Numerous varieties of configurations of vertical and/or horizontal applicators are possible, as outlined by attached figures. The presented figures are not limiting but only serve as some of the possible configurations. The selection of vertical and horizontal elements, their number, sequence, length of individual applicators and other design elements are selected based on the nature of processed material, desired thermal treatment levels, flow rate and targeted power delivery per individual applicator segment and for any serial or parallel combinations of applicators.

Figure 40:
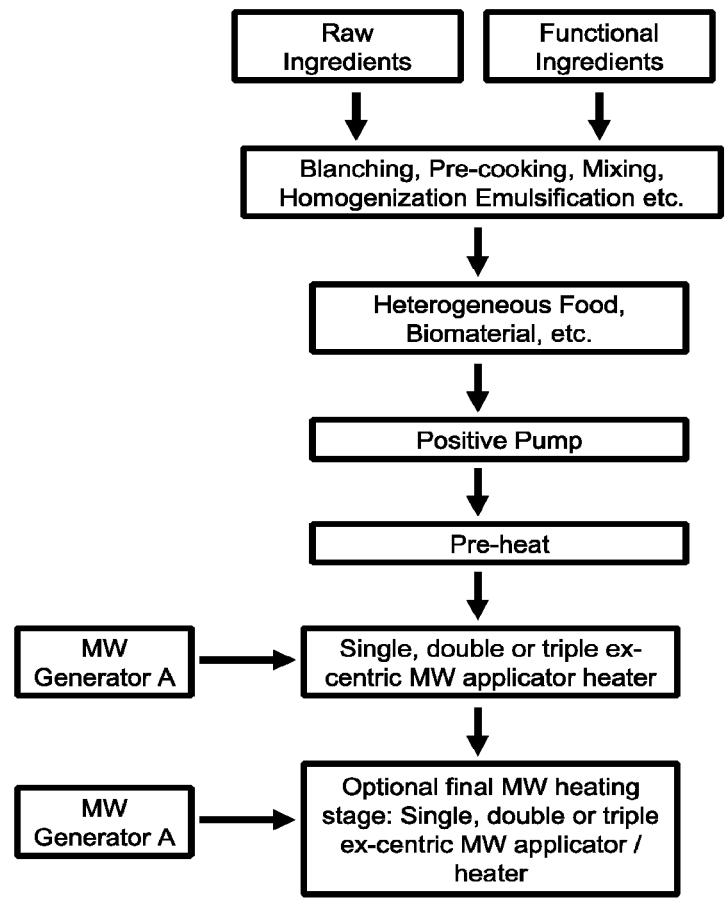
FIGS. 40-41 illustrate possible process flow diagrams
Figure 41:
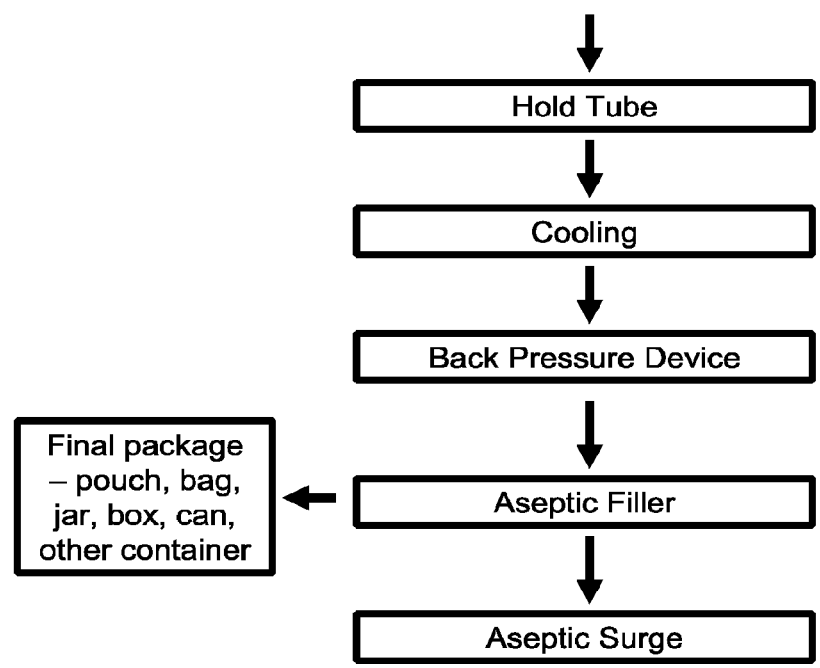

There are numerous other embodiments of the present invention. FIGS. 16-39 illustrate a number of variations. These include multiple sections which could be in a horizontal or vertical orientation of any combination of horizontal and vertical sections. FIG. 40-41 show possible process flow diagrams for the elements for the process.

FIGS. 16-39 illustrate the construction concept of single ex-centric traveling wave applicator, two consecutive ex-centric applicator and three consecutive ex-centric applicator devices for thermal treatment of foods, biomaterials and other materials. The presented configurations are intended as illustrations of some of the possible alternatives and embodiments of the devices that constitute the subject of this invention.

The food, biomaterial or other material to be processed is introduced through a microwave-transparent conduit (typically a sanitary tube made of Teflon, ceramics, glass, Ultem, PEEK, TPX, Ultem and other microwave-transparent polymers—or any combination or laminate fabricated from combinations or layer of listed materials) concurrently with the introduction of microwave energy—ensuring that the energy is delivered to the processed material gradually over an expanded exposure region.

A modular concept and simple and easy configurability of the system also allows for more flexibility in selecting the vertical vs. horizontal (slightly inclined) flow regimes—the system can be configured to allow for certain types of flow regime exposure accommodating individual material biochemical and biophysical characteristics. For example, if the material is anticipated to undergo certain types of chemical and physical conversions such as lipid melting, protein denaturation and/or gel formation or breakdown, the system can be conveniently constructed from a sequence of ex-centric MW applicator modules to allow for an orderly occurrence of these changes—and additional in-flow segments out of the MW application area to minimize the extreme variability in temperature distribution caused by these changes and improve control of thermal energy application.

All together, these characteristics of the presented devices and systems assembled using these devices as components provide for a much more stable, predictable and controllable means of delivering rapid, uniform thermal treatment to heterogeneous foods, biomaterials and other materials with varying structure, dielectric and biophysical properties of allow for thermal treatment delivery.

In continuous flow heaters implementing advanced electromagnetic energy fields, pumpable foods and biomaterials concurrently heat and move, in which the rate of heating as well as the rate of motion through the heating device depend on the power of the field, uniformity of the field and therefore the distribution of power within the field, dielectric properties of heated materials, dependence of dielectric properties of heated materials on temperature and temperature-dependent physical characteristics of heated materials, thermophysical properties of heated materials (such as thermal conductivity, thermal diffusivity, density, viscosity etc.) and the residence time within the heater i.e. the time of exposure of heated materials to the electromagnetic field resulting in temperature increase in the pumped material.

Uniformity determines whether all of the elements within the food or biomaterial have been adequately treated with an appropriate thermal pasteurization or sterilization—level of exposure resulting in inactivation of all microorganisms of concern—whether they are microorganisms of public health significance (pathogens) or microorganisms with a capability to cause quality degradation, spoilage and limiting of shelf life of the food and biomaterial products without endangering the consumer (spoilage microorganisms). If this treatment delivery is not uniform and is not appropriately controlled, quantified and monitored this can result in undesirable processing outcomes—an unsafe or unstable product or a product which needs to be thermally over-processed to such an extent that the resulting degradation and damage to the nutritional and quality components such as vitamins, other thermo-sensitive nutrients, antioxidants, colorants, flavors and texture-defining compounds and ingredients is such that it defeats the advantages of implementing an advanced, rapid heating technology.

Figure 39:
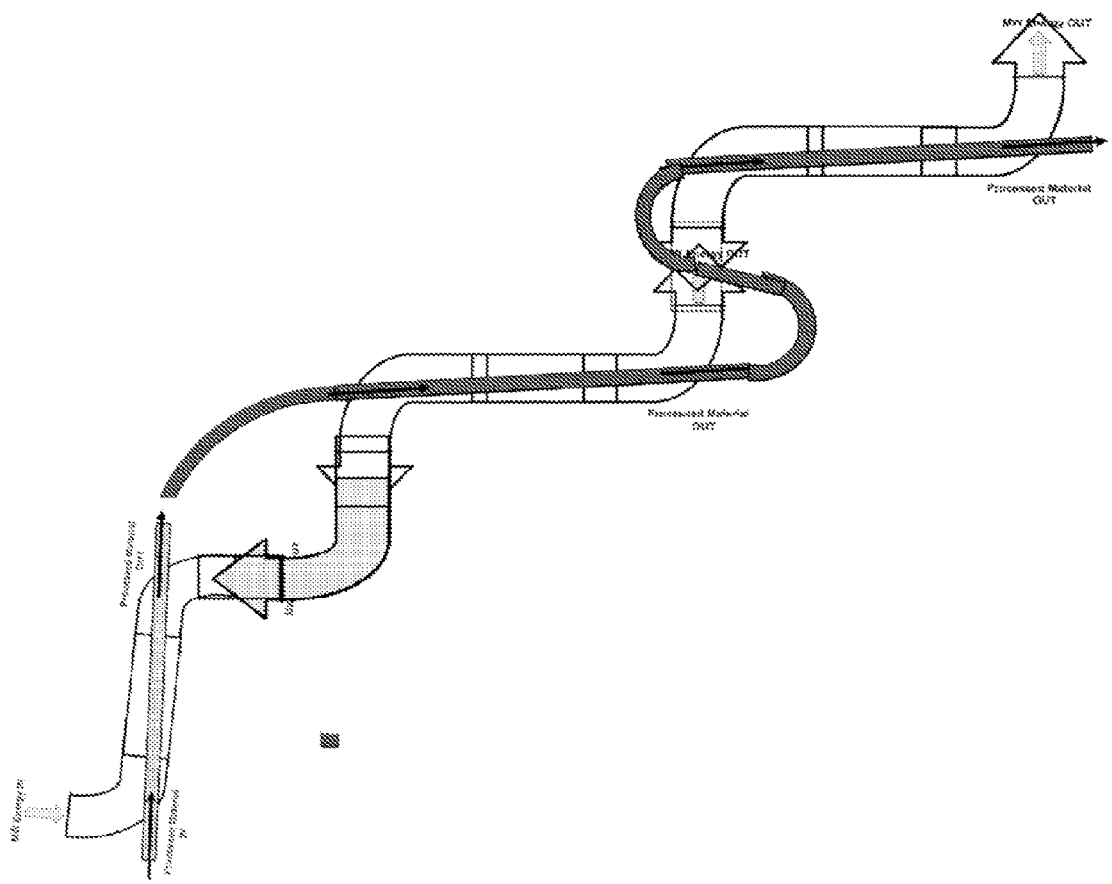

As shown in FIG. 39, the illustrated device is a rotating flow-through assembly which can be integrated with heat exchangers and improves the equalization of spatial and temporal exposure to thermal and electromagnetic energy during advanced heating of viscous and heterogeneous foods and biomaterials.

Embodiments of the invention enables exposure to advanced thermal heating methods during horizontal and upwardly inclined flow regimes, thus limiting the length of the travel path of materials of different properties and associated heating rates. Furthermore, rotation of the entire flow-through exposure region repetitively forces the more dense segments of the material to the upper regions of the flow as well concurrently forcing the less dense, more buoyant elements and components to the bottom of the flow. In both cases, the rate of vertical buoyancy-related movement during horizontal pumping of flow is counteracted by the radial rotation of the flow-through region, effectively equalizing both spatial (in cases where the energy field is non-uniform) and temporal (whereby the faster, more buoyant particles are obstructed in their horizontal flow progress by collisions with the denser, less buoyant particles and therefore slowed down, concurrently with the denser, less buoyant particles getting accelerated by collisions with faster particles). Additionally, continuous rotational tumbling and resulting vertical movement of particles ensures that particle accumulation (slugs in flow) is minimized and a uniform load of all present components is maintained relatively consistent.

Embodiments of the invention can be conveniently integrated into existing and emerging advanced heating devices within continuous flow aseptic processing systems and also used to equalize the thermal and electromagnetic energy exposure of materials within energy fields that are imperfectly and non-uniformly distributed in space, thereby enabling processing of these materials using less expensive, more widely available sources of energy, such as 2450 MHz generators Embodiments of the presently disclosed invention is the first example of the use of non-magnetic metallic material components as tags or enclosures for residence time and particle location detection in multi-point continuous flow processing configurations, independently or in functional combination with magnetic material tags or implants and magnetic field detection.

Embodiments of the invention address the issues of ability to discern among different individual particles during real time monitoring and detection as well as the ability to discern the difference between the switched and un-switched states of thermo-sensitive implants.

The application areas for embodiments of the present invention are continuous flow and batch processing of thermally-treated materials, with the objective of achieve a state of pasteurization, stabilization (extended shelf life) or sterilization for multiphase (particle-containing) foods and/or biomaterials. Additionally, other processes dealing with thick, highly viscous and slurry-type materials could also be used with the invention.

Non-magnetic metallic materials (preferably aluminum, copper or zinc) are used as implants, enclosures, shields or wraps within or around the simulated food or biomaterial particles, optionally carrying other tags and/or thereto-sensitive implants. Simulated particles carrying the metallic tags or enclosures are passed through the continuous flow processing system The system may be fitted with non-metallic pass-through segments (pipe sections) and (preferably) inductive proximity sensors, switches and/or detectors. Inductive detectors/sensors are used to determine and record the time and location of passage of non-magnetic, metallic material—tagged particles Optionally, a concurrent associated system of magnetic tags/implants and a network of magnetic field sensors/detectors is implemented to enable monitoring and detection of magnetically tagged simulated particles (independent or combined with metallic, non-magnetic implants and tags).

Both non-magnetic metallic and magnetic field sensors/detectors are optionally configured with more than a single level of detection sensitivity—this can be achieved by sensor selection (combining the inductive sensors capable of detecting smaller and larger sizes of metallic implants/containers, combining magnetic-field sensors with various sensitivity ratings, e.g. NVE AA002-02—high sensitivity versus NVE AAH-002-02—ultra high sensitivity), as well as adjusting the sensitivity of implemented sensors in situ by selection of oscillation frequencies (for induction-type sensors/detectors) or adjusting the voltage of operation for GMR NVE sensors.

In the simplest form, particle flow monitoring system can comprise only induction-type sensors, monitoring the times of passage and residence time of non-magnetic metal material tagged implants and tags.

Another embodiment is a multi-detection location combination of single sensitivity level induction—type detectors and a single sensitivity level GMR magnetic field sensors. This system is capable of independently detecting and recording the passage and residence times of metallically tagged, magnetically tagged and combined metallic/magnetic tagged particles. Additionally, such a system is capable of detecting the passage time as well as thermal switching state of metallically-tagged, thermo-magnetic switch containing simulated particles.

Up to the point until such particle achieves the switched state of the thermo-magnetic switch within the particle, it is detected only by the metal-detector, inductive sensors along the continuous flow-pathway during the process. Once the switched state of the thermo-magnetic switch within the flowing particle has been achieved, the particle is detected by both induction type sensors as well as magnetic field sensing (GMR) sensors.

Additional embodiments of the invention implement multiple sensitivity levels of either or both of the non-contact detector types for non-magnetic metallic (pref. inductive) and/or magnetic (pref. GMR) detection.

For example, if high and low sensitivity versions are selected and implemented for both metallic and magnetic detectors—or achieved by adjustments outlined above, the table below illustrates the particle tag combinations and/or detection capabilities can be achieved.

| PARTICLE TAG/ IMPLANT TYPE | | DETECTED BY Sensor Detector Type and Sensitivity Level | | | |
|---|---|---|---|---|---|
| | | METALLIC | | MAGNETIC | |
| METALLIC | MAGNETIC | Standard | High | Standard | High |
| None | Small | 0 | 0 | 0 | + |
| None | Large | 0 | 0 | + | + |
| Small | None | 0 | + | 0 | 0 |
| Large | None | + | + | 0 | 0 |
| Small | Small | 0 | + | 0 | + |
| Small | Large | 0 | + | + | + |
| Large | Small | + | + | 0 | + |
| Large | Large | + | + | + | + |

Therefore, eight different particle implant/tag configurations would be easily detectable by combining presence/absence and size of metallic and magnetic implants.

Each of the outlined configurations/ID tags could optionally be assigned to a single or multiple predetermined thermo-sensitive implant type—thermo-magnetic switches, bacterial spore loads, enzymic, chemical and/or physical TTIs etc.

These could, in turn have associated real time or post-process evaluation functionality for recording, analysis and storage.

The flowcharts and block diagrams in the FIGS. 40 and 41 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

Embodiments of the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for treating a pumpable material, the apparatus comprising:
    at least one chamber having a longitudinal length and comprising a first conductive surface, a second conductive surface opposing the first conductive surface, a first end at one end of the at least one chamber, and a second end at another end longitudinally opposing the first end of the at least one chamber, the first end and the second end each comprising an opening to allow the pumpable material to pass through the chamber in a direction along the longitudinal length of the at least one chamber, the opening of the first end for the pumpable material being at a first position, the opening of the second end for the pumpable material being at a second position, the first position being nearer the first conductive surface than the second position, and the second position being between the first conductive surface and the second conductive surface; and
    a channel for allowing pumpable material to be transferred from the first end to the second end of the chamber so that the pumpable material flows along the longitudinal length of the at least one chamber;
    wherein the at least one chamber is configured to receive electromagnetic energy from a source, the electromagnetic energy creating an electromagnetic field between the conductive surfaces, the electromagnetic field being lower near the conductive surfaces;
    wherein the channel is passed through an opening in a bend,
    wherein a conductive sleeve that is larger than the channel extends from the opening in the bend, and
    wherein the length of the sleeve is at least a quarter wavelength of the electromagnetic energy.

2. The apparatus as described in claim 1, wherein the channel is oriented so that it is one of substantially parallel to or at a slight elevation relative to a ground.

3. The apparatus as described in claim 1, wherein the first conductive surface and the second conductive surface comprise opposite sides of a rectangular waveguide.

4. The apparatus as described in claim 1, further comprising:
a plurality of chambers, wherein the channel traverses at least a portion of each of the plurality of chambers.

5. The apparatus as described in claim 4, further comprising:
at least one device placed in the channel between the chambers for mixing the pumpable material.

6. The apparatus as described in claim 1, wherein the electromagnetic energy travels from the first end to the second end along the longitudinal length of the at least one cavity.

7. An apparatus for treating a pumpable material, the apparatus comprising:
at least one chamber comprising a first conductive surface, a second conductive surface, a first end, and a second end, the first end and second end each comprising an opening to allow the pumpable material to pass through the chamber; and
a channel for allowing pumpable material to be transferred from the first end to the second end of the chamber,
wherein the chamber is configured to receive electromagnetic energy from a source, the electromagnetic energy creating an electromagnetic field between the conductive surfaces, the electromagnetic field being lower near the conductive surfaces,
wherein the channel is passed through an opening in a bend,
wherein a conductive sleeve that is slightly larger than the channel extends from the opening in the bend, and
wherein the length of the sleeve is at least a quarter wavelength of the electromagnetic energy.

8. The apparatus as described in claim 7, wherein the opening of the first end for the pumpable material is positioned near one of the conductive surfaces.

9. The apparatus as described in claim 8, wherein the opening of the second end for the pumpable material is positioned at one of:
near a center point between the two conductive surfaces; or
one of the conductive surfaces which is positioned opposite to the first end; or
one of the conductive surfaces which is adjacent to the first end.

10. The apparatus as described in claim 7, wherein the channel is oriented so that it is one of substantially parallel to or at a slight elevation relative to a ground.

11. The apparatus as described in claim 7, wherein the conductive surfaces comprise opposite sides of a rectangular waveguide.

12. The apparatus as described in claim 7, further comprising:
a plurality of chambers, wherein the channel traverses at least a portion of each of the plurality of chambers.

13. The apparatus as described in claim 12, further comprising:
at least one device placed in the channel between the chambers for mixing the pumpable material.

14. An apparatus for treating a pumpable material, the apparatus comprising:
at least one chamber having a longitudinal length disposed in a horizontal orientation and comprising a first conductive surface, a second conductive surface opposing the first conductive surface, a first end at one end of the at least one chamber, and a second end at another end longitudinally opposing the first end of the at least one chamber, the first end and the second end each comprising an opening to allow the pumpable material to pass through the chamber in a direction along the longitudinal length of the at least one chamber, the opening of the first end for the pumpable material being at a first position, the opening of the second end for the pumpable material being at a second position, the first position being nearer the first conductive surface than the second position, and the second position being above the first position and between the first conductive surface and the second conductive surface; and
a channel for allowing pumpable material to be transferred from the first end to the second end of the chamber so that the pumpable material flows along the longitudinal length of the at least one chamber; and
wherein the at least one chamber is configured to receive electromagnetic energy from a source, the electromagnetic energy creating an electromagnetic field between the conductive surfaces, the electromagnetic field being lower near the conductive surfaces.

15. The apparatus as described in claim 14 wherein the channel is oriented so that it is at a slight elevation relative to a ground.

16. The apparatus as described in claim 14, wherein the first conductive surface and the second conductive surface comprise opposite sides of a rectangular waveguide.

17. The apparatus as described in claim 14,
wherein the channel is passed through an opening in a bend,
wherein a conductive sleeve that is larger than the channel extends from the opening in the bend, and
wherein the length of the sleeve is at least a quarter wavelength of the electromagnetic energy.

18. The apparatus as described in claim 14, further comprising:
a plurality of chambers, wherein the channel traverses at least a portion of each of the plurality of chambers.

19. The apparatus as described in claim 18, further comprising:
at least one device placed in the channel between the chambers for mixing the pumpable material.

* * * * *